Dec. 5, 1967  J. V. FREDD  3,356,145
WELL TOOLS
Filed April 19, 1965  7 Sheets-Sheet 4
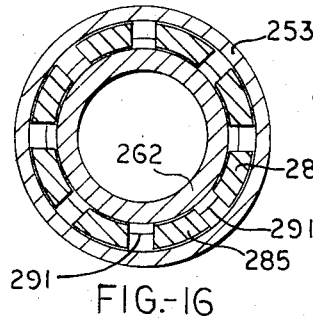
FIG.-16
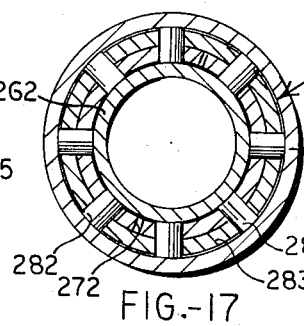
FIG.-17
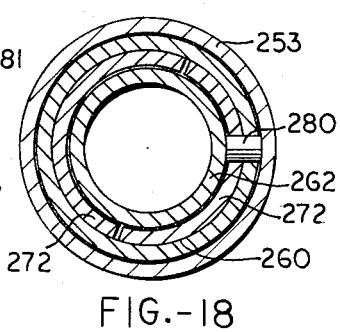
FIG.-18
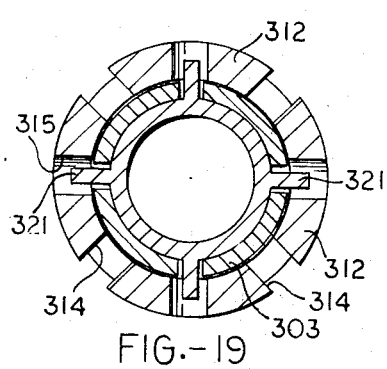
FIG.-19
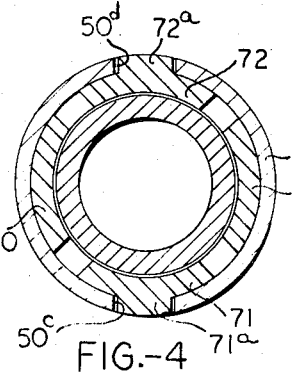
FIG.-4
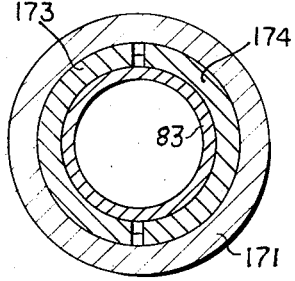
FIG.-12
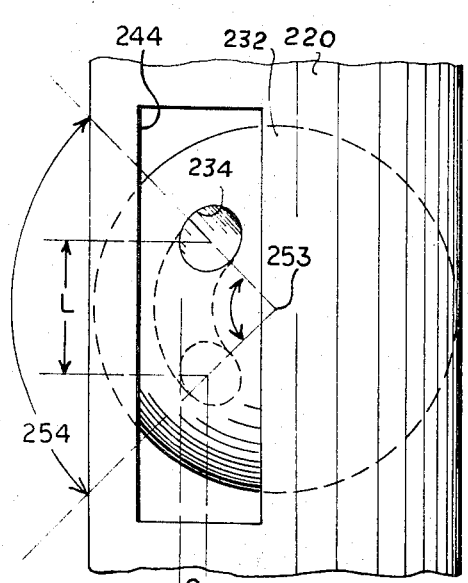
FIG.-15-B
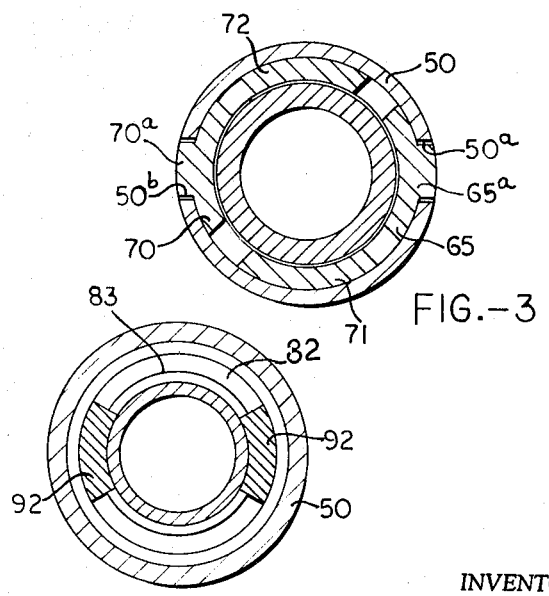
FIG.-3
FIG.-6
INVENTOR
JOHN V. FREDD
BY
ATTORNEYS Dec. 5, 1967   J. V. FREDD   3,356,145
WELL TOOLS Filed April 19, 1965   7 Sheets-Sheet 5

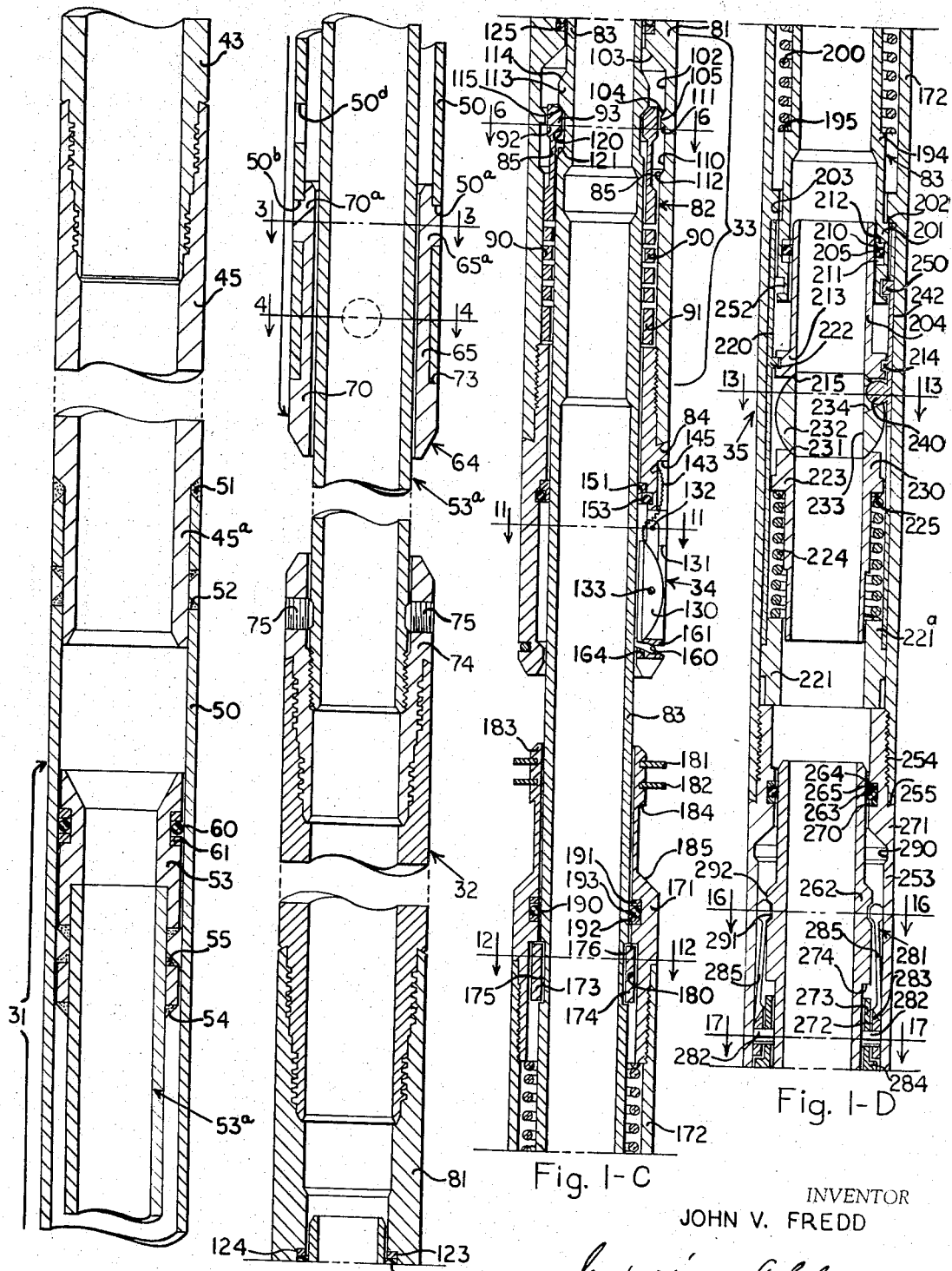

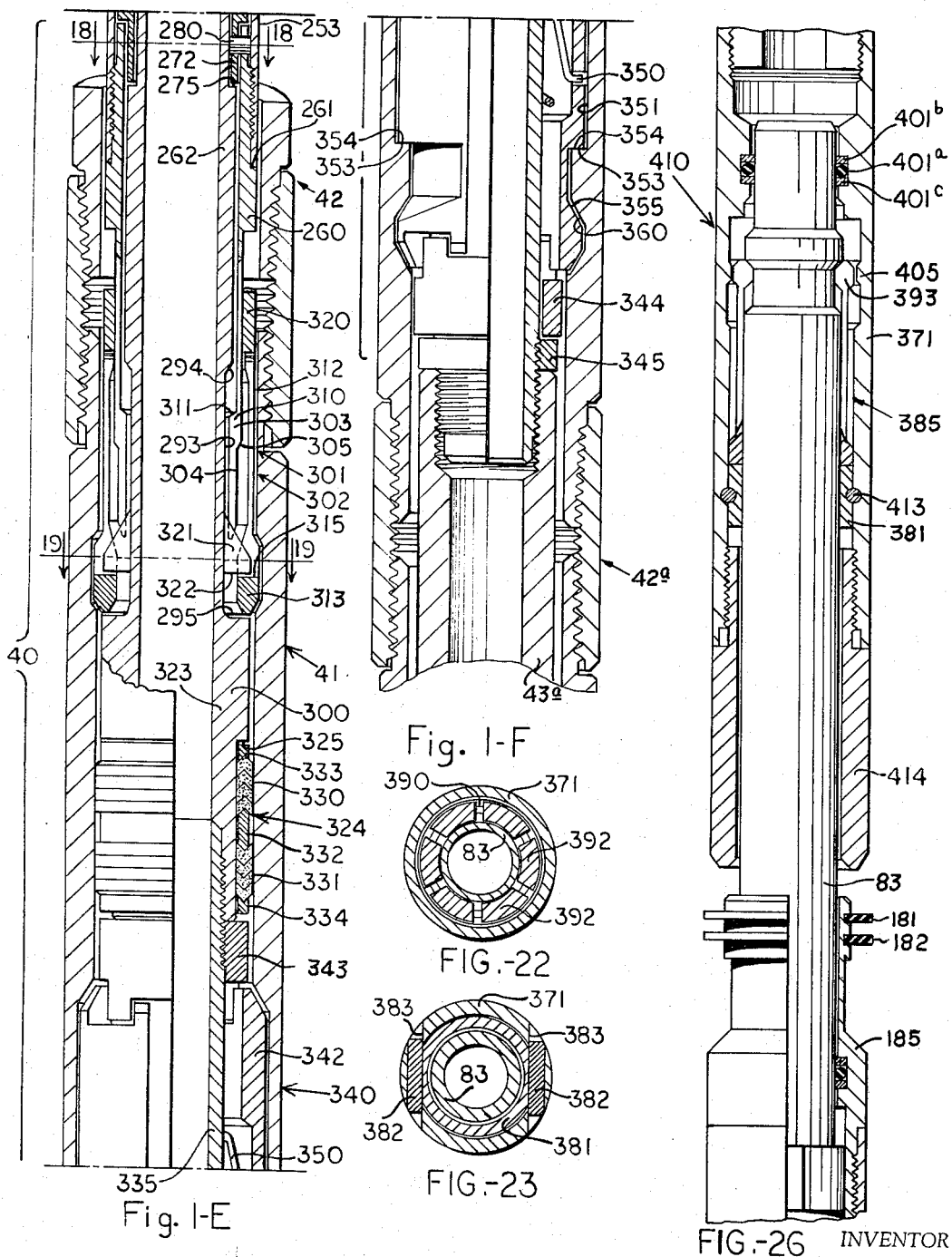

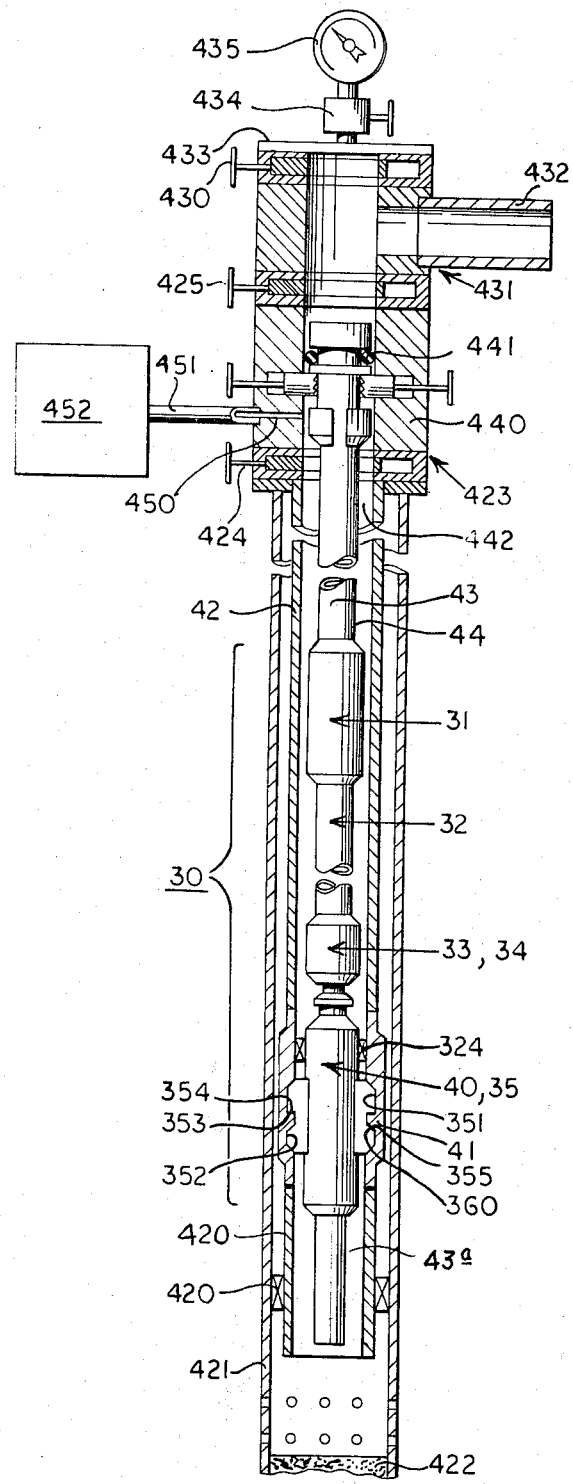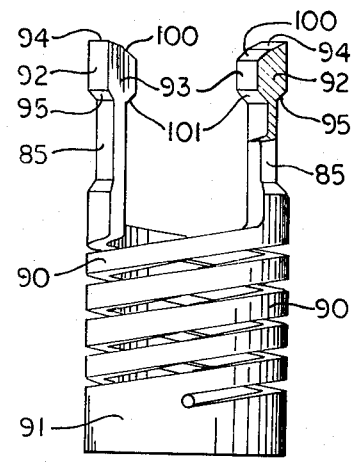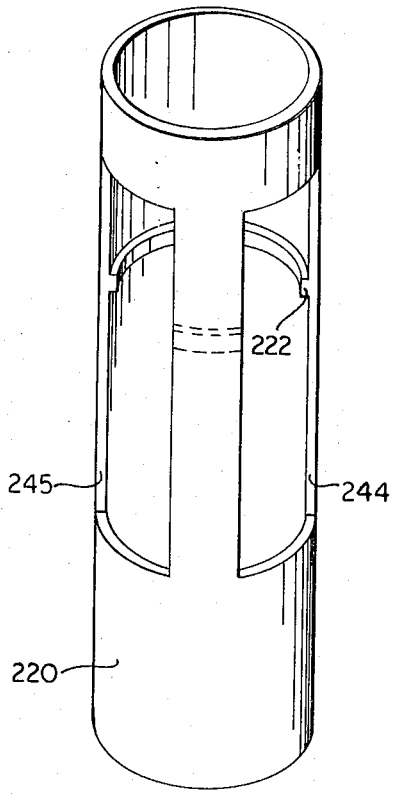

INVENTOR
JOHN V. FREDD
BY
ATTORNEYS

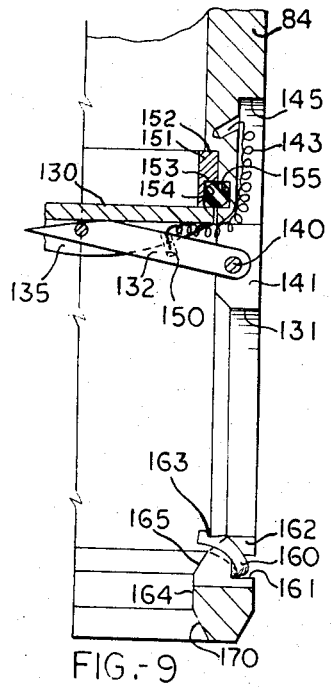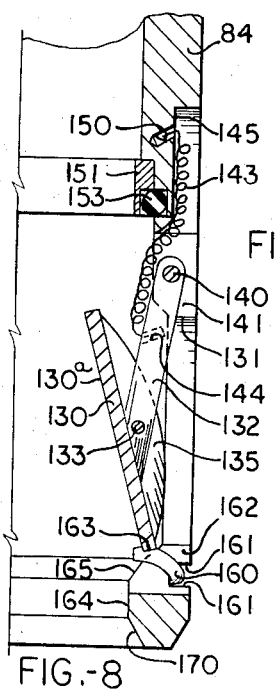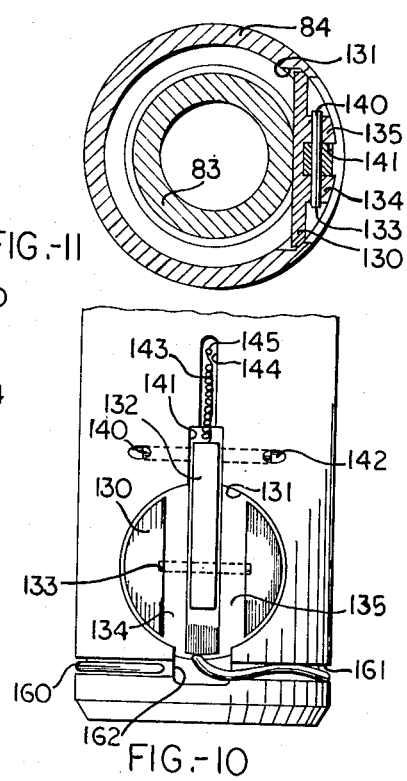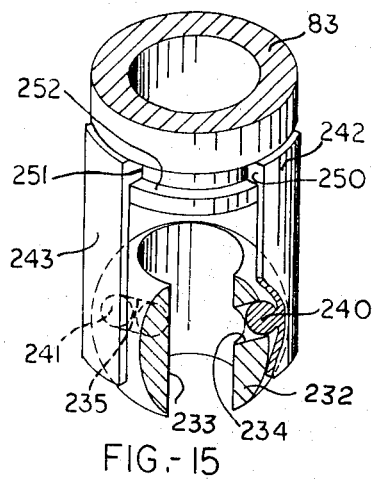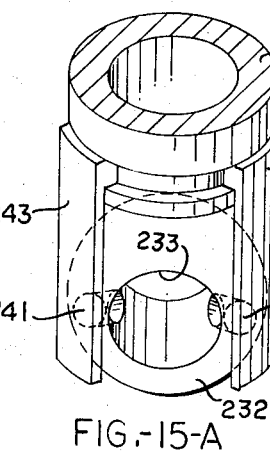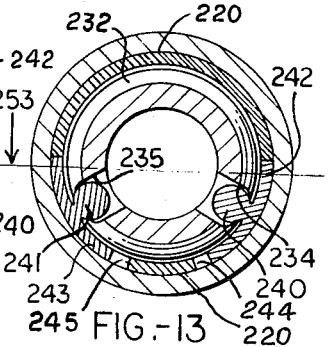

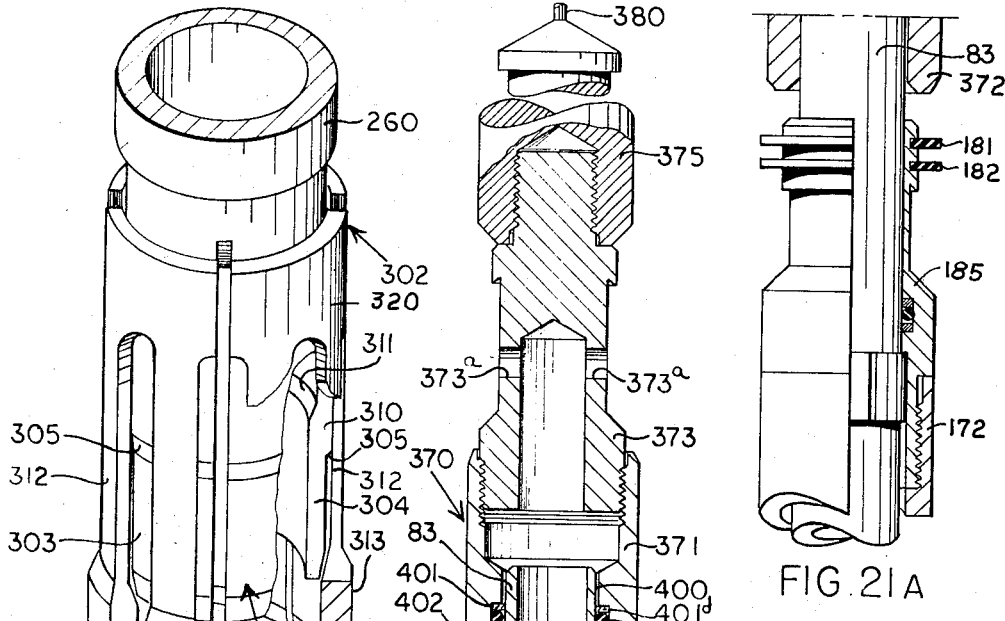
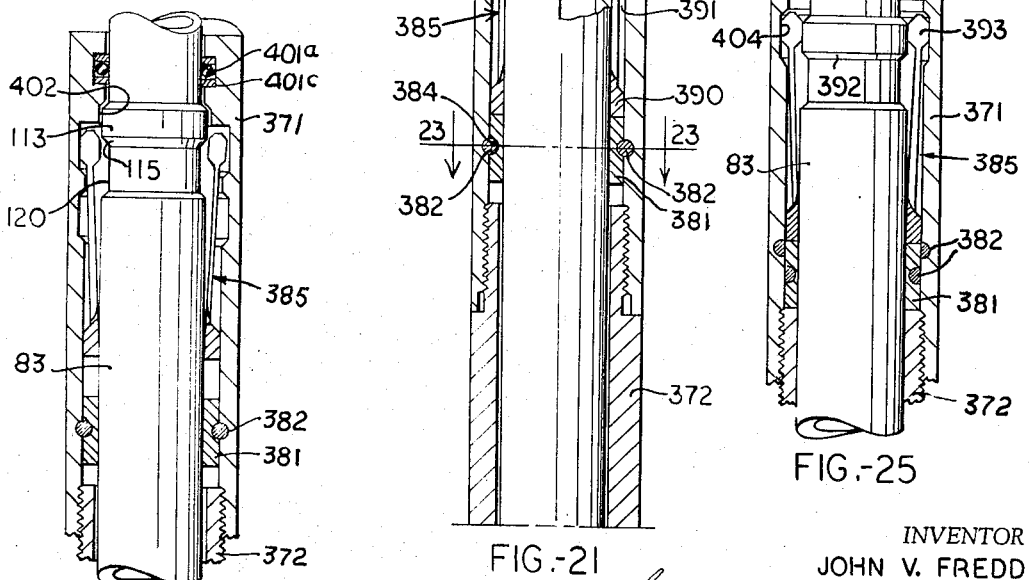

United States Patent Office 3,356,145
Patented Dec. 5, 1967

3,356,145
WELL TOOLS
John V. Fredd, Dallas, Tex., assignor to Otis Engineering Corporation, Dallas, Tex., a corporation of Delaware
Filed Apr. 19, 1965, Ser. No. 449,108
28 Claims. (Cl. 166—224)

ABSTRACT OF THE DISCLOSURE

A subsurface weight operated safety valve for wells, provided with full opening bore and operable automatically in response to predetermined pressure conditions within the well.

---

This invention relates to well tools and more particularly to a flow control device for controlling the flow of fluids through a well flow conductor.

One object of this invention is to provide a new and improved flow control device for use in a well flow conductor to control fluid flow through the flow conductor responsive to a predetermined change in a variable which may be independent of the conditions within the conductor.

It is another object of the invention to provide a new and improved safety valve for use in a flow conductor of a well.

It is a further object of the invention to provide a flow control device which may be used in a well conductor at any desired depth.

It is an additional object of the invention to provide a flow control device which does not have a depth limitation above the paraffin level and thus is operable within a well bore at a depth below the paraffin level.

It is another object of the invention to provide a flow control device which does not necessitate running a small hydraulic line to the device from the surface independent of the conductor in which the device is positioned.

It is another object of the invention to provide a flow control device having a valve which is biased toward a closed position by a weight column, the weight column being counterbalanced to hold the valve in open position by the pressure of fluid in an annular flow passage around and separate from the flow passage in which the valve is disposed and through which the flow control device controls fluid flow.

It is a further object of the invention to provide a weight biased flow control device held in open position by a pressure medium controllable by one or more variables which may be independent of the fluid flow controlled by such device.

It is a further object of the invention to provide a flow control device which may be installed in a landing nipple in a conductor without the necessity of removing the conductor from the well for the purpose of attaching a hydraulic control line.

It is an additional object of the invention to provide a flow control device which may be installed in a tubing string and the bore of the well closed by the device while a pipe string is installed without the necessity of employing blow-out preventers and similar control devices at the surface.

It is a further object of the invention to provide a flow control device having locking means below the device, allowing a full bore passageway through the device so that various well tools may be introduced into and removed from the well through the flow control device.

It is a further object of the invention to provide a flow control device which eliminates the necessity of providing an enlarged section in the string of tubing to accommodate a flow control device of sufficient bore to permit the passage of well tools therethrough.

It is another object of the invention to provide a flow control device which may be installed in a fluid conductor with a minimum of surface equipment.

It is another object of the invention to provide a tool for running in and positioning a well tool within the bore of a well.

It is also an object of the invention to provide a pulling tool for removing a well tool from the bore of a well.

It is an additional object of the invention to provide a running tool for positioning the flow control device of the invention within a well bore.

It is also an object of the invention to provide a pulling tool for lifting the flow control device of the invention from a well bore.

It is a further object of the invention to provide the combination of a flow control device with a running tool for positioning such device within the bore of a well.

It is a still further object of the invention to provide a flow control device in combination with a pulling tool for removing such device from a well bore.

Additional objects and advantages of the invention will be readily apparent from the reading of the following description of a device constructed in accordance with the invention, and reference to the accompanying drawings thereof, wherein:

FIGURES 1–A through 1–F together constitute a longitudinal view partially in section and partially in elevation of a flow control device in accordance with the invention;

FIGURE 2 is a diagrammatic representation of the flow control device installed in a fluid conductor in a well;

FIGURE 3 is a sectional view taken along the line 3—3 of FIGURE 1–B;

FIGURE 4 is a sectional view taken along the line 4—4 of FIGURE 1–B;

FIGURE 6 is a sectional view taken along the line 6—6 of FIGURE 1–C;

FIGURE 7 is a perspective view of the detent collet used in the connection to the upper end of the safety valve;

FIGURE 8 is an enlarged fragmentary longitudinal view partially in section and partially in elevation of the flapper valve at the lower end of the coupling between the weight section and the upper end of the safety valve, showing the flapper valve latched in the open position as when running the weight section and tubing string into the well;

FIGURE 9 is a view similar to FIGURE 8, showing the flapper valve in closed position as when withdrawing the weight section and tubing string from the well;

FIGURE 10 is a fragmentary view in elevation of the lower end of the weight section showing the back side of the flapper valve when the valve is in the open position and the weight section is engaged over the upper end of the safety valve section as illustrated in FIGURE 1–C;

FIGURE 11 is an enlarged sectional view taken along the line 11—11 of FIGURES 10 and 1–C;

FIGURE 12 is a sectional view along the line 12—12 of FIGURE 1–C;

FIGURE 13 is a sectional view along the line 13—13 of FIGURE 1–D;

FIGURE 14 is a view in perspective of the sleeve which encases the ball safety valve;

FIGURE 15 is a view in perspective of the ball valve, its operator member, and the operator tube, showing the valve in open position;

Figure 5:
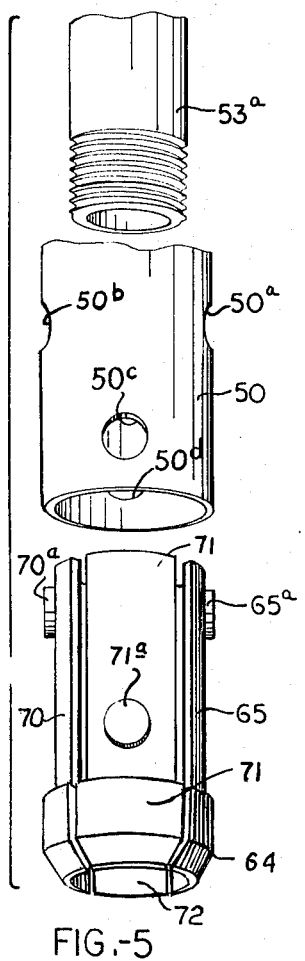
FIGURE 5 is an exploded perspective view of the retainer assembly used in the telescoping joint to hold the upper end of the weight section within the lower end of the inner tubing string.

FIGURE 15–A is a view in perspective illustrating the ball valve, its operator members, and the operator tube with the ball valve in closed position;

FIGURE 15-B is an enlarged, fragmentary, diagrammatic view of the valve sleeve of FIGURE 14 with the ball valve in position within the sleeve and the operator members removed showing one of the windows in the sleeve and illustrating the arcuate path followed by one of the operator holes of the ball valve as the ball valve moves between the open and closed positions;

FIGURE 16 is a sectional view along the line 16—16 of FIGURE 1-D;

FIGURE 17 is a sectional view along the line 17—17 of FIGURE 1-D;

FIGURE 18 is a sectional view taken along the line 18—18 of FIGURE 1-E;

FIGURE 19 is a sectional view along the line 19—19 of FIGURE 1-E;

FIGURE 20 is an exploded view in perspective illustrating the lower end of the lock sleeve and the primary collet lock of the lock mandrel assembly used in securing the safety valve in a nipple in the tubing of a well.

FIGURES 21 and 21-A taken together constitute a longitudinal view partially in section and partially in elevation of the running tool used to position the safety valve within a well bore, showing the tool engaged over the upper end of the operator tube of the flow control device;

FIGURE 22 is a sectional view along the line 22—22 of FIGURE 21;

FIGURE 23 is a sectional view along the line 23—23 of FIGURE 21;

FIGURE 24 is a fragmentary view partially in section and partially in elevation of the running tool showing the position of the collet of the tool as the tool is being latched over the upper end of the operator tube of the flow control device;

FIGURE 25 is a longitudinal, fragmentary view, in section and elevation showing the running tool collet position and shear pins severed as the tool is lifted from the flow control device after setting the device in a well bore; and, FIGURE 26 is a longitudinal view partially in section and partially in elevation of the pulling tool for removing the safety valve from a well bore, showing the tool installed over the upper end of the operator tube of the safety valve.

Referring to FIGURES 1-A through 1-F and FIGURE 2, the flow control device 30 includes a telescoping joint 31, a weight or floating section 32, a detent assembly 33, a flapper valve assembly 34, a ball valve 35, and a lock mandrel assembly 40. The lock mandrel assembly secures the flow control device within the landing nipple 41 which is a part of outer tubing string 42 through which an inner tubing string 43 extends. The telescoping joint forms a longitudinally slidable connection between the inner tubing string 43 and the floating section so that the floating section may be raised and lowered relative to the inner tubing string to open and close the ball valve. The floating section is supported in an upward position to hold the ball valve opened by a pressure differential between the pressure in the annular space 44 between the inner tubing string 42 and the outer tubing string 43 and the pressure in the flow stream in the tubing string 43. The weight of the floating section biases the ball valve toward a closed position while the pressure of a fluid in the annulus between the inner and outer tubing strings biases the floating section in an upward position to hold the valve open. A decrease in pressure of the fluid biasing the floating section upwardly releases the floating section to impose its weight on the ball valve closing the valve irrespective of and independent of the ambient pressure around the ball valve and weight section mechanism.

In FIGURES 1-A through 1-F, the ball valve is illustrated in open position and the lock mandrel assembly located within the landing nipple but not yet locked against upward movement from the nipple. Referring to FIGURE 1-A, the bottom section of the inner tubing string 43 is threaded to the tubing joint 45 which is suitably secured at the reduced end section 45a to the upper end of the tubular body 50 of the telescoping section. The connection between the section 45 and the body 50 is made by welding the upper end of the body around the tubing joint at 51 and also by welding the members together through a plurality of circumferentially spaced holes 52 formed around the body.

An annular piston head 53 is slidably disposed within the body 50 and secured on the upper end of the piston rod 53a by an annular weld at 54 and welds between the floating section and the piston head through a plurality of circumferentially spaced holes 55 extending through the piston head. A port 50d through the body 50 permits the movement of fluids into and out of the body as the piston head reciprocates in the body. The O-ring 60 disposed in the annular recess 61 of the piston head between the back-up rings 62 and 63 seals between the piston head and the inner wall of the body 50. As will be discussed in more detail hereinafter, the action of fluid under pressure beneath the annular piston head 53 biases the floating section upwardly to maintain the safety valve in open position.

The lower portion of the telescoping joint 31 includes an annular retainer assembly 64 engaged in the lower end of the body section 50 to hold the piston head within the body. By so limiting the downward movement of the piston head relative to the body by means of the stop assembly, the body may be lifted until the upper end of the stop assembly engages the lower end of the piston head at the weld 54 to raise the floating section and the safety valve. The stop assembly, as represented in FIGURES 1-B, 3, 4, and 5, is segmented to facilitate insertion of the assembly into the body. The assembly consists of the cylindrical segments 65 and 70 having upper outwardly projecting lugs 65a and 70a, respectively, as seen in FIGURES 1-B, 3, and 5, and of the cylindrical segments 71 and 72 having the lower outwardly projecting lugs 71a and 72a, respectively, as shown in FIGURES 4 and 5. The segments 65 and 70 are held in the body by engagement of the lugs 65a and 70a in the upper holes 50a and 50b, respectively, while the segments 71 and 72 are retained in the body by engagement of the lugs 71a and 72a, respectively, in the lower holes 50c and 50d, respectively, of the body. Each of the segments is enlarged around its lower end forming an upwardly facing shoulder 73 extending around the assembly engaging the lower end of the body 50. Since the function of the stop assembly is to limit the downward travel of the piston head within the body 50, the several segments of the assembly are loosely fitted with respect to each other and around the floating section to facilitate their insertion into the body.

The piston rod 53a is threaded at the lower end into the coupling 74, which is locked to the piston rod by a plurality of the socket set screws 75 radially positioned around the coupling engaging the piston rod as illustrated in FIGURE 1-B. The coupling 74 is threaded into the upper end of the weight section 32 comprising a variable number of the tubular members depending upon the weight required at the operating depth of the valve. The lower end of the weight section is threaded to the detent section body 81 shown in FIGURES 1-B and 1-C. A detent collet 82 is loosely positioned within the body 81 to releasably connect the body to the upper end of the safety valve operator tube 83. The collet is held in the body by engagement of the lower end of the collet with the upper end of the flapper valve body or cage 84 threaded into the lower end of the body 81. As shown in FIGURE 7, the collet includes the collet fingers 85 formed on the spring sections 90 which extend from a base ring 91, thereby allowing the collet fingers to flex both laterally and longitudinally. Each of the collet fingers has an outer boss 92 and an inner boss 93. The outer bosses extend from the upper ends or shoulders 94 to the lower upwardly and outwardly inclined shoulders 95. The inner bosses 93 are defined by the inwardly convergent upper and lower internal shoulders 100 and 101. Referring to FIGURE 1–C, the body 81 has an upper internal annular locking recess 102 between an upper internal annular shoulder 103 and the lower internal annular shoulder 104 of an inwardly extending annular flange 105. The lower internal annular locking recess 110 is formed within the body 81 between the downwardly sloping internal annular bottom shoulder 111 of the flange 105 and the upwardly facing internal annular shoulder 112. The safety valve operator tube is provided with an external annular locking flange 113 between the external annular shoulders 114 and 115. An external annular locking recess 120 extends on the tube 83 between the shoulder 115 and the external upwardly facing annular shoulder 121. The collet fingers cooperate with the recesses and flanges on both the operator tube and within the body 81 for connecting and disconnecting the lower end of the weight section and the upper end of the operator tube, as will be explained in more detail hereinafter.

The O-ring 122 is fitted within the recess 123 in the body 81 between the back-up rings 124 and 125 to seal between the inner wall of the body and the outer wall of the safety valve tube.

As shown in FIGURE 1–C, the flapper valve assembly 34 is mounted on the valve cage 84. Referring to FIGURES 8–11, the flapper valve 130 is supported for movement between the full open position illustrated in FIGURE 1–C when the valve is disposed within the circular opening 131 extending through the body 84 and the closed position illustrated in FIGURE 9. The valve is pivotally supported on an arm 132 by a pin 133 extending through the arm and the parallel spaced longitudinal flanges 134 and 135 formed on the back side of the flapper valve. The arm 132, whose upper end extends into the vertical slot 140 of the valve cage is pivotally connected to the valve cage by a pin 141 which extends through the tangentially oriented hole 142 in the valve body. The flapper valve is biased toward the closed position by a spring 143 extending from a hole 144 in the arm through the longitudinal slot 145 to the hole 150 in the valve cage. The opposite ends of the spring are secured in the holes 144 and 150 in a suitable manner, as by friction fit or the like. When the valve is in closed position, as in FIGURE 9, it seats against the valve seat 151 fitted in the recess 152 of the valve body. The O-ring seal 153 disposed in the annular recesses 154 of the valve seat and 155 of the valve body seals between the valve body and the valve seat. When the inner tubing string including the flapper valve assembly is being run downwardly into a well bore over the upper end of the check valve operator tube, the flapper valve is held in open position by a latch spring 160 disposed in an external annular slot 161 of the valve body. The latch end of the latch spring extends through the slot 162 in the valve body to releasably engage the lower edge of the flapper valve, as illustrated in FIGURE 8, to hold the valve in open position while the tubing string is being run downwardly through the well bore and over the upper end of the check valve operator tube. The notch 163 in the spring is shaped so that when the valve cage 84 moves over the operator tube 83, the outer surface of the tube will engage the inner face 130a of the flapper valve to displace the valve into the opening 131 and disengage the notch 163 of the lower rim of the valve. Movement of the flapper valve from the position of FIGURE 8 to the vertical position of FIGURE 1–C releases the spring from the valve rim. When the flapper valve assembly is over the safety valve operator tube, the external surface of the tube holds the flapper valve in the full open outward position within the opening 131 of the body as shown in FIGURE 1–C. The spring 143 biases the flapper valve toward the closed position of FIGURE 9 due to the pulling force exerted by the spring between the valve body and the valve arm 132. Thus, when the flapper valve assembly is lifted from over the safety valve operator tube, the spring 143 pulls the flapper valve to the closed position. The lower end of the valve cage 84 is provided with the extending internal annular flange 164 having an upper sloping shoulder 165 and lower sloping shoulder 170 to facilitate movement of the valve body over the safety valve operator tube.

Referring to FIGURE 1–C, the safety valve operator tube 83 extends through the head member 171 which is threaded into the upper end of the safety valve housing 172. The operator tube is coupled with the head member by the split ring segments 173 and 174, see FIGURE 12, disposed in the cooperating external annular recess 175 around the operator tube and the internal annular recess 180 within the head member. The recess 180 extends to the lower end of the head member and thus is substantially longer than the recess 174 thereby permitting longitudinal movement of the operator tube relative to the head member while limiting the upward movement of the operator tube so that the head member is lifted by the split rings when the tube is raised to engage the split rings with annular shoulder 176 of the head member defining the upper end of the recess 180.

The external annular flexible rings 181 and 182, mounted on the upper enlarged head are engageable with the internal surfaces of the external tubing string 41 to form a sand barrier therebetween which prevents sand from accumulating around the lower portions of the catch device by migrating downwardly around the head member of the valve. An external annular downwardly sloping flange 184 is formed on the head member at the lower end of the head 183 and an upwardly facing external annular flange 185 is formed around the head member below the flange 184. The O-ring 190 is positioned between back-up rings 191 and 192 in internal annular recess 193 within the head member to seal between the inner wall of the head member and the operator tube.

Referring to FIGURES 1–C and 1–D, the safety valve operator tube 183 extends downwardly into the safety valve housing 172 with an enlarged section 194 of the operator tube providing an upwardly facing shoulder 195. A spring 200 disposed around the operator tube engages the lower end of the head member 171 and the shoulder 195 and biases the operator tube in a downward direction. The enlarged bottom section 201, of the operator tube provides an upwardly facing external annular shoulder 202 which engages the bottom annular shoulder of the internal annular flange 203 of the valve housing to limit upward movement of the operator tube relative to the valve housing.

An upper tubular safety valve seat 204 has an upper portion slidably disposed within the lower end of the operator tube. An O-ring 205 positioned between the back-up rings 210 and 211 in the internal annular recess 212 within the lower end of the operator tube 83 seals between the valve seat and the internal surface of the tube. An external annular flange 213 is formed around the lower end of the valve seat and provided with an external annular recess 214. An annular downwardly facing valve seat surface 215 is formed on the lower end of the valve seat 204. An internal annular sleeve 220, see FIGURES 1–D and 14, is disposed within the valve housing 172 between the flange 203 and the lower valve seat guide 221. An internal annular flange 222 of the sleeve is received in the recess 214 around the upper valve seat locking the upper valve seat against longitudinal movement within the valve housing. The sleeve is of a resilient substance and deforms outwardly as the upper valve seat is telescoped downwardly thereinto and the external flange 213 thereof moves past the internal flange 222 until the flange 222 moves into alignment with the recess 214. This assembly of the upper valve seat to the sleeve is, of course, performed prior to their insertion into the valve housing 172. A lower valve seat 223 is biased upwardly by a spring 224 disposed around the lower valve seat and between the upper end of the valve seat guide and the lower external annular shoulder 225 of the upper enlarged portion 230 of the lower valve seat. An internal annular upwardly facing seat surface 231 is formed on the upper end of the lower valve seat.

A ball valve 232 disposed between the valve seat surfaces 215 and 231 has a flow passage 233 to permit fluid flow through the flow control device when the ball valve is in the open position illustrated in FIGURE 1–D. The upper valve seat is held against upward movement by engagement with the flange 222 while the lower valve seat is biased upwardly by the spring 224 causing the ball valve always to be held in engagement with its upper and lower seats.

The ball valve is provided with operator holes 234 and 235, see FIGURE 13, which receive the operator knobs 240 and 241 formed on the operator members 242 and 243, respectively. As best illustrated in FIGURE 14, the operator members 242 and 243 are disposed in the longitudinal windows or slots 244 and 245 formed in the sleeve 220. The slots 244 and 245 are each sufficiently longer and wider than the operator members to permit the necessary longitudinal and circumferential or lateral movement of the operator members to rotate the ball valve between open and closed positions. The operator members 242 and 243 are, respectively, provided at their upper ends with the internal flanges 250 and 251 which are slidably received in the external annular groove 252 of the operator tube 83 so that longitudinal movement of the operator tube will raise and lower the operator members to rotate the ball valve. Longitudinal reciprocation of the operator members by the operator tube causes the operator knobs to rotate the ball valve between open and closed positions about the axis 253 as represented in FIGURES 13 and 15–B. The ball valve is rotated between open and closed positions through the angle 254 which is an angle of substantially 90 degrees. During the movement of the ball valve, the operator holes 234 and 235 move a distance L longitudinally and a distance C circumferentially as represented in the FIGURE 15–B. To move the ball valve between open and closed positions, the operator members must move longitudinally the distance L while the operator knob on each of the operator members must follow the arcuate path illustrated in the dotted line portion of the FIGURE 15–B, thus causing the operator members to each move circumferentially the distance C. The flanges 250 and 251 fit sufficiently loosely within the recess 252 to permit this circumferential movement of the operator members as they are moved longitudinally to rotate the ball valve. In order for the operator members to move the distance C circumferentially, their flanges must slide in the recess 252 and in so doing, each of the two operator members moves the distance C toward the other member and then away the same distance to rotate the ball valve through the required 90 degrees for moving the ball valve between closed and open position. Each of the operator members will move laterally or circumferentially around the recess through an arc of approximately 10 degrees while rotating the ball between the open and closed positions. Each of the operator holes moves through an arc of approximately 15 degrees while the ball rotates between its closed, and open positions. The shorter arcs of movement of the operator knobs are due to the fact that when the ball is in its fully open and fully closed positions, the knobs are in outer positions in the operator holes more further inwardly into the operator holes as the ball approaches and reaches a middle position during its movement between its fully open and fully closed positions and then again moves to their outer positions in the operator holes as the ball moves from its middle position toward its fully open or fully closed position. Thus, the operator members will converge toward each other and move away from each other a total of twenty degrees during the rotation of the ball valve. It will therefore be obvious that each of the windows 244 and 245 must be wider than the widths of the operator members by substantially 10 degrees of arc or a circumferential distance C and they must be longer than the operator members by the longitudinal distance L in order to contain the operator members and permit their combined longitudinal and circumferential movement during the rotation of the ball valve.

As the ball valve is rotated by the operator members, its longitudinal position within the valve housing remains fixed since the ball valve is biased into sealing engagement with the fixed upper valve seat by the force of the spring 224 which urges the lower valve seat upwardly against the ball valve.

The lower valve seat guide 221, which fits within the lower end of the sleeve 220 along an upper reduced section 221a is held against downward movement by the upper end of the secondary collet housing 253 threaded into the lower end of the valve housing 172. The upper end section 254 of the housing 253 is reduced in diameter providing the upwardly facing external annular shoulder 255 against which the lower end of the valve housing rests providing a substantially smooth external surface along the connection between the valve housing and the secondary collet housing. The collet housing is threaded on the primary collet lock sleeve 260 as shown in FIGURE 1–E with the lower end of the housing engaging the upwardly facing annular shoulder 261 of the lock sleeve. A collet lock mandrel 262 is positioned within the secondary collet housing 253 and the collet lock sleeve 260 as shown in FIGURES 1–D and 1–E with the O-ring 263, positioned in the internal annular recess 264 within the housing 253 between the back-up rings 265 and 270 to seal between the external surface of the upper end of the lock mandrel and the internal annular boss 271 within the housing. An annular split sleeve 272 is disposed around the lock mandrel 262 within the external annular recess 273 of the lock mandrel with upward movement of the sleeve relative to the lock mandrel being limited by the annular shoulder 274 at the upper end of the recess and downward movement of the split sleeve relative to the mandrel being limited by the annular shoulder 275 at the lower end of the recess. As illustrated in FIGURES 1–E and 18, the split sleeve fits within the upper end of the lock sleeve 260 to which the split sleeve is secured by a shear pin 280 which releasably engages the split sleeve and lock sleeve. Referring to FIGURES 1–D and 17, a secondary collet 281 is secured around the split sleeve 272 by a plurality of shear pins 282 which extend through the base ring 283 of the collet into the split sleeve. An external annular flange 284 around the split sleeve is engageable with the lower end of the base ring of the secondary collet and with the upper end of the collet lock sleeve 260. The collet fingers 285 of the secondary collet serve to releasably connect the housing 253 with the lock mandrel 262, the collet fingers being receivable in the internal annular recess 290 within the housing and the external annular recess 291 of the lock mandrel. An annular locking surface 292 is formed around the lock mandrel above the locking recess 291.

As shown in FIGURE 1–E, the lock mandrel 262 is reduced along the intermediate section 293 with the reduced section extending from a sloping downwardly facing annular shoulder 294 to a lower external annular shoulder 295, which is at the upper end of the enlarged bottom section 300 of the lock mandrel. A primary collet assembly 301 is disposed around the lock mandrel with the major portion of the assembly extending along the reduced portion 293. Referring to FIGURES 1–E, 19 and 20, the primary collet assembly, which functions to lock the flow control device 30 against upward movement within the landing nipple 41, includes the primary collet 302, which is loosely fitted about the lock mandrel and the locking fingers 303 which are formed on and extended downwardly from the lock sleeve 260 around the lock mandrel within the collet. When the device is in locked position within the landing nipple, the locking fingers hold the primary collet in locked position within the nipple. The FIGURES 19 and 20 best illustrate the relationship of the locking fingers with the primary collet. Each of the locking fingers 303 has a thin lower end section 304 extending downwardly from the sloping shoulder 305 formed on the thicker central portion 310 of the locking finger. An internal upwardly facing sloping shoulder 311 is formed on the upper end of each of the enlarged central sections of the locking fingers. The enlarged central section and the lower thin section of the locking fingers are positioned around the reduced section 293 of the locking mandrel so that the shoulder 294 on the locking mandrel and the shoulder 311 on the locking fingers are engageable with each other.

The primary collet 302 includes a plurality of downwardly extending collet fingers 312, each having an outer locking surface or boss 313 which is engageable in the locking recess of the landing nipple. Between each of the collet fingers is a downwardly opening slot 314 while each of the fingers is provided with a slot 315 which opens upwardly through the base ring 320 of the collet. A plurality of radially extending fins 321 are formed around the lock mandrel 262 along the reduced section 293. Each of the fins extends into one of the slots 315 formed in each of the collet fingers 312 to hold the collet in the downward position shown in FIGURE 1-E. As best shown in FIGURE 19, each of the locking fingers 303 is positioned behind a slot 314 overlapping the inside surface of half of one of the locking fingers and half of the other locking finger adjacent to the slot. Each of the locking fingers may engage half of the inside surface of two adjacent collet fingers. The locking fingers coact with each other to lock the collet fingers 312 in the landing nipple.

The lock mandrel 262 is reduced along a lower section 323 around which is disposed the packing assembly 324 which is held against upward movement by the downwardly facing annular shoulder 325 on the mandrel. The packing assembly comprises a V-shaped packing 330 and 331 confined between the male adaptor 332 and the female adaptors 333 and 334.

The lock mandrel 262 is threaded on the lower end to a locator mandrel 335 which supports the selector key assembly 340 which locates the flow control device at the correct position for locking within the desired landing nipple. The selector keys 341 and 342 are supported on the mandrel between the key nut 343 threaded on the mandrel at the lower end of the lock mandrel and the key retainer 344 supported on the mandrel below the keys by the threaded nut 345. The selector keys are biased outwardly by springs 350 engaged between the mandrel and the keys. The keys engage the complementary shaped annular key grooves 351 and 352 within the landing nipple so that the engagement of the downwardly facing selector key shoulders 353 with the upwardly facing landing nipple shoulder 354 prevents downward movement of the device through the landing nipple. The upwardly and inwardly sloping surfaces 355 and the complementary surface 360 within the landing nipple permit upward movement of the device. As explained in more detail in U.S. Patent No. 2,798,559 issued to J. V. Fredd, July 9, 1957, the selector keys perform a locating function permitting the flow control device to be moved through a tubing string until the device arrives at a landing nipple having key grooves corresponding to the configuration of the outer surface of the selector keys.

Referring to FIGURE 21, the running tool 370 is shown locked on the operator tube 83 for lowering the flow control device downwardly through a well bore to the position for locking the device within the landing nipple 41. The running tool includes a tubular body 371 threaded at the lower end on a sleeve-like skirt 372 and at the upper end to a head member 373 which has an upper reduced threaded section 374 for the engagement of a support member 375 suspended from a wire line 380. The ports 373a in the head member allow fluid flow between the central flow passage through the tool and the exterior so that the tool may be lowered and raised in a fluid filled hole. A retainer ring 381 is secured within the housing above and spaced apart from the skirt by the tangential shear pins 382 which are engaged through the tangential holes 383 through the housing and the tangential semicircular recesses 384 on opposite sides of the retainer ring.

The collet assembly 385 is loosely disposed within the housing above the retainer ring. The collet assembly includes a base ring 390 from which extend a plurality of collet fingers 391 each having a collet head 392 with an outwardly extending boss 393 and an inwardly extending boss 394.

The housing 371 is reduced in internal diameter along a section 400 which is provided with an internal annular seal recess 401 containing an O-ring 401a between the back-up rings 401b and 401c. An internal recess 402 is formed in the housing for receiving the shoulder 114 and the upper portion of the locking flange 113 around the operator tube 83. An upper annular locking recess 403 and a lower annular locking recess 404 are formed within the housing separated from each other by the internal annular locking flange 405.

The structure of the pulling tool 410 in FIGURE 26 is substantially identical to the running tool with minor exceptions which will be explained and thus all of the identical parts and features of the tool have been given the same reference numerals. The shear pins 413 are identical in size to the shear pins 382 and differ therefrom only in the material of which they are constructed so that their shear strength will be greater. The shear pins 413 generally will be formed of steel or bronze as contrasted with a softer metal such as aluminum which may be used in the shear pins 382. Also, only one shear pin 382 may be used whereas normally two of the shear pins 413 will be employed. The skirt 414 threaded into the lower end of the housing differs from the skirt 372 in the length of the portion of the skirt below the housing since the longitudinal position of the operator tube is lower when removing the flow control device from a well bore as contrasted with its position when running the device into a well bore. In all other respects of the same basic tool may be employed for both running and pulling with the proper skirt and shear pins being installed depending upon the function that the tool is to serve.

A typical well arrangement in which the flow control device may be installed for operation is illustrated in FIGURE 2. The well is equipped either initially or when installing the device with a tubing string provided with a landing nipple 41 in which the flow control device is to be set and locked. It is preferred that the flow control device and thus the landing nipple be installed at a depth which is below the paraffin level. Since available valves use a spring acting against and supporting a fluid column from the surface to operate the valve, they are generally limited to depths which may be in the paraffin zone due to limitations as to spring strength. The present flow control device does not depend upon a spring to close the valve and thus is not limited to shallow depths where paraffin would be a problem in clogging up the valve mechanism. The tubing string extension 42a may extend downwardly through the well packer 420 which is any suitable form of a packer for sealing the annular space between the tubing string and the casing 421. Also, the tubing 43a, as in FIGURE 1-F, may extend from the lower end of the lock mandrel assembly to any desired depth, such as to or below the lower end of the tubing section 42a. The well bore may have been plugged back by cement or other suitable material at 422.

The landing nipple 41 is a special form of tubular nipple having the internal recesses 41a to receive the selector keys 342 for locating the safety valve at the proper elevation within the tubing. A suitable landing nipple is the Otis Type "S" Landing Nipple illustrated and described on page 3663 of the Composite Catalogue of Oil Field Equipment and Services, 1964-65 edition, published by World Oil, Houston, Texas.

The tubing string is supported from a suitable well head 423 which may include a first master valve 424, a second master valve 425, and a swab valve 430. Between the second master valve and the swab valve a T or cross connection 431 is included to permit the connection of a flow line 432 which may lead to conventional surface equipment such as a separator and a tank battery, not shown, for the handling of produced well fluids. The upper end of the swab valve is closed by the flange 433 through which is secured a conventional needle valve 434 and a pressure gauge 435.

The complete flow control device 30 is installed in the tubing string of the well bore in several procedural steps during each of which one or more of the functional units of the device is engaged within the tubing string. The lock mandrel assembly 40 with the valve assembly 35 are first installed and locked in place as a unit in the tubing string. These are then followed by the detent assembly, the floating weight section 32 and the telescoping joint 31 which also are all introduced as a unit into the tubing string and engaged with the valve assembly by latching the detent assembly over the upper end of the operator tube 83.

The valve assembly 35 together with the lock mandrel 40 are lowered as a unit supported from the running tool 370. The valve assembly and lock mandrel are first interconnected in the relationship illustrated in FIGURES 1-D and 1-E by threading the head 271 into the lower end of the housing 172. In assembly of the lock mandrel the collet 281 and related members are positioned as shown with the shear pins 280 and 282 installed to hold the units in the relationship where the collet fingers 285 are engaged in the locking recess 291 around the collet lock mandrel 262. Also the collet lock fingers 303 are held by the shear pin 280 in the relationship shown in FIGURE 1-E while running the devices into the well. The running tool 370 is latched over the operator tube 83 of the valve assembly as shown in FIGURE 21. The running tool is placed over the upper end of the valve operator tube with the operator tube moving into the running tool to the position shown in FIGURE 24 where the locking flange 113 moves into contact with the internal recess 402 with the locking flange camming the collet heads 392 outwardly into the annular recess 403 to allow the locking flange to pass to the position shown where the collet finger heads will move past the shoulder 115 on the lower end of the locking flange. The collet assembly 385 is loosely fitted within the housing 371 and around the operator tube so that the collet assembly may move upwardly with the operator tube to the position where the collet heads will move outwardly into the recess 403. With the relationship between the valve operator tube and the running tool shown in FIGURE 24, the collet finger heads are positioned to where they may be cammed inwardly to engage the shoulder 115. The running tool is lifted so that the internal annular flange 404 engages the bosses 393 on the collet finger heads to force the heads inwardly around the operator tube into the locking recess 120 with the upper ends of the collet finger heads engaging the shoulder 115 to support the operator tube and thus permit the valve assembly and lock mandrel assembly to hang from the running tool on the collet fingers. The running tool is lifted with the flange 405 moving into alignment with the bosses 393 on the collet finger heads to hold the collet finger heads in the recess 120 of the operator tube as illustrated in FIGURE 21. The spring 200 biases the operator tube downwardly and, therefore, the ball valve 232 toward a closed position. When the lock mandrel and valve assemblies are suspended from the running tool, the lock mandrel and the valve housing 172 are urged downwardly by their weight in opposition to the biasing force of the spring. This weight may be sufficient to hold the valve housing downwardly relative to the operator tube to keep the ball valve in the open position so that fluid may flow freely through it as the lock mandrel and valve are lowered to position in the tubing string. In the event, howver, that the spring 200 is so strong that the weight of the lock mandrel assembly and the safety valve housing will not hold the ball valve in open position, the skirt 372 on the running tool is of sufficient length that its lower end will engage the upper end of the head 183 on the head member of the valve housing so that the operator tube of the valve is held upwardly relative to the valve housing at a position which will maintain the ball valve at least partially open to the degree necessary to allow well fluids to flow through the valve as it is lowered through the tubing string.

The lock mandrel and valve are lowered through the tubing string 42 until the lock mandrel reaches the landing nipple 41. The landing nipple 41 may be one of several in the tubing string, particularly if a plurality of valves are to be installed in the string. Whether the landing nipple 41 is one of several or the only landing nipple in the string, the key grooves 351 and 352 of the landing nipple conform to the shape of the selector keys 341 and 342 so that when the lock mandrel reaches the landing nipple 41, the selector keys will be expanded by the springs 350 into the key grooves with the landing nipple shoulder 354 engaging the selector key shoulders 353 to provide support for the lock mandrel and prevent its further movement downwardly. The selector keys thus provide a means for receiving the lock mandrel in the proper landing nipple and give vertical support to the lock mandrel.

During the lowering of the lock mandrel and valve through the tubing string, the well fluids in the tubing string move through the central flow passage extending through the mandrel and valve upwardly into the running tool and outwardly from the running tool through the lateral ports 373a back into the tubing string so that any piston effect from the lowering of the assemblies through the tubing string which might hinder their free movement is minimized.

When the lock mandrel is positioned in the landing nipple as above described, jarring impacts are applied to the upper end of the head member 171 by a suitable jar, not shown, incorporated in the wire line to the string. Jars useful in wire line tool strings are discussed on pages 3742-43 of the Composite Catalogue of Oil Field Equipment and Services, 1964-65 edition, published by World Oil, Houston, Texas. The force from the jar is applied by the lower end of the skirt 372 of the running tool to the upper end of the head member with the force being transmitted downwardly through the valve housing 172 and the housing 253 to the collet lock sleeve 260 which is interlocked with the collet assembly 281 by the shear pin 280. The selector keys are holding the lock mandrel against downward movement within the landing nipple and thus the collet lock mandrel 262 cannot move downwardly by virtue of its connection through the key nut 343 and locator mandrel 335 which are directly supported by the selector keys. With the lock mandrel 262 held against downward movement, the sleeve 272 is also held against downward movement by its engagement with the shoulder 275 on the lock mandrel. The inner end of the shear pin 280 is engaged in the sleeve 272 and thus a downward force by the jar which tends to push the collet lock sleeve 260 downwardly will shear the shear pin 280 freeing the collet lock sleeve to move downwardly inserting the locking fingers 303 on the lower end of the collet sleeve behind the primary collet fingers 312 to hold the collet fingers outwardly so that the outer locking surfaces 313 are held in the locking recess 40a of the landing nipple. The locking fingers wedge the collet fingers by virtue of their position behind the collet fingers in an expanded relationship which prevents the lock mandrel from being lifted upwardly so long as the locking fingers remain in this position behind the collet fingers, the lock mandrel cannot be lifted. As the housings 172 and 253 are lowered in order to lower the locking fingers, the locking recess 290 within the housing 253 moves downwardly until it is in alignment with the heads of the collet fingers 285 which then spring outwardly into the locking recess. The normal position of the collet fingers 285 is outward thus they readily spring into the locking recess when it is in alignment with them. Any force which tends to lift the valve and the locking mandrel raises the housing 253 which by virtue of the engagement of the collet fingers 285 in the locking recess 290 causes a lifting force on the collet 281 which, through its base ring is secured by the plurality of shear pins 282 to the sleeve 272. The upper end of the sleeve 272 upon upward movement engages the shoulder 274 around the lock mandrel 262 since the lock mandrel is locked against upward movement by the collet fingers 312. Any effort to move the housing 253 upwardly will apply a force to the collet fingers 285 which, through the shear pins 282 and the sleeve 272 acts against the shoulder 274 of the lock mandrel 262 to hold the housing 253 and thus the entire valve on the lock mandrel. When the housing 253 moves upwardly after the collet fingers are engaged in the locking recess 290 sufficiently to place the upper end of the sleeve 272 against the shoulder 274, the collet finger heads are in alignment with the external locking flange 292 around the lock mandrel 262 so that the collet fingers are locked in the locking recess 290 by the flange 292 and cannot be sprung inwardly by this upward movement of the housing 253. Thus, since the lock mandrel 262 is held downwardly and the locking flange 292 holds the collet fingers 285 in locking engagement with the locking recess 290, the collet fingers provide the latching mechanism between the lock mandrel and the housing. As will be explained hereinafter, the valve may be removed from the lock mandrel by shearing the pins 282.

After the lock mandrel and safety valve are latched in the landing nipple as described above the running tool may be removed from the operator tube of the valve. The tool is lifted upwardly with sufficient force to shear the pins 382 engaged between the housing and the retainer ring 381. Since the retainer ring is held against upward movement by the collet which is engaging the locking recess of the safety valve operator tube, the upward force on the housing of the running tool causes the shearing of the pins to free the housing to move upwardly until the upper end of the skirt 372 engages the lower end of the retainer ring, at which position the lower locking recess 404 is in alignment with the head 392 on the collet fingers 391. Lifting the housing of the running tool causes the retainer ring to lift the collet with the shoulder 115 on the operator tube camming the collet fingers outwardly into the recess 404 so that the collet fingers will release from the operator tube to permit the running tool to be lifted from over the operator tube thus releasing the running tool from the valve so that the wireline tool string may be removed from the well bore.

After the lock mandrel and valve are latched in the landing nipple as above described, the weight section 32 along with the telescoping joint 31 are installed in the tubing string and latched to the upper end of the valve. The valve presently is in the closed position to which it is moved upon removal of the running tool by the spring 200 which engages the shoulder 195 on the operator tube forcing the operator tube downwardly causing the operator members 242 and 243 engaged in the recess 252 to be forced downwardly to rotate the ball valve to the closed position. The weight section is latched over the upper end of the operator tube of the valve by the detent assembly 33. The detent assembly, the weight section, and the telescoping joint are assembled in the relationship best illustrated in FIGURES 1-A through 1-C. The flapper valve 130 is latched in the open position illustrated in FIGURE 1-C by engagement of the notched spring 160 with the lower edge of the flapper valve to hold the valve open so that the detent assembly may be placed over the upper end of the operator tube 83 of the safety valve. In view of the length of the tubular members involved, the detent, weight, and telescoping sections will require assembly as the different portions are lowered into the well bore. For example, the weight section 32 may be several hundred feet in length. The detent assembly 33 with the flapper valve latched in open position is engaged on the lowermost section of the weight section and the detent assembly is lowered into the well bore as the weight section is assembled together in the conventional manner of running tubing into a well bore. When the desired length of weight section has been assembled and supported in the well bore it is followed by the telescoping section which is secured with the weight section as shown in FIGURES 1-A and 1-B with the telescoping section being lowered into the well bore by the inner tubing string 43. During the lowering of the detent assembly and weight section the weight of the units extends the telescoping section to its maximum length with the shoulder formed by the weld 54 at the lower end of the piston head engaging the upper end of the retainer assembly 64 so that the retainer assembly holds the piston within the tubular section 50 and supports the weight section and detent assembly. The inner tubing string is lowered until the detent assembly and flapper valve slide over the upper end of the operator tube 83 with the spring 160 being disengaged from the lower edge of the flapper valve as the flapper valve passes over locking flange 113. The flapper valve is then free and slides along the outer surface of the operator tube. The flapper valve housing and detent assembly passes downwardly over the operator tube with the collet 82 which is loosely fitted within the body 81 engaging the upper shoulder 114 on the operator tube holding the collet upwardly until the recess 102 of the body is aligned with the heads of the collet fingers so that the shoulder 114 may cam the collet finger heads outwardly into the recess 102 as the shoulder 103 within the body forces the collet finger heads downwardly. The collet finger heads pass the locking flange 113 to snap inwardly around the lower shoulder 115 of the locking flange. When the collet has been latched over the locking flange of the operator tube and the shoulders 103 and 114 are engaged, the weight of the weight section will be supported on the valve which in turn is supported from the lock mandrel 40 latched in the landing nipple 41. As soon as the detent assembly latches over the upper end of the valve operator tube and the weight section becomes supported on the valve, the telescoping section may contract with the tubular section 50 sliding downwardly over the piston rod 53a and the piston head 53 moving farther into the tubular section. The latching on of the detent assembly to the operator tube should be readily detectable at the surface due to the reduction in the apparent weight of the tubing string when the support of the weight section is placed on the operator tube. As soon as the detent assembly is engaged on the upper end of the operator tube, the tubing string is lifted with the upper end of the retainer assembly 64, engaging the lower end of the piston 53 at the weld 54 to place a slight strain on the detent assembly to determine if it is properly latched. The lifting of the tubing string will raise the housing 81 of the detent assembly causing the inner locking flange 105 to move in alignment with the outer bosses 92 of the collet fingers 85 retaining the collet fingers in the locking recess 120 so that the collet remains engaged with the operator tube while the lower end of the collet is lifted by the upper end of the flapper valve housing 84. The lifting of the collet raises the operator tube, moving the ball safety valve 232 to the open position illustrated in FIGURE 1-D. Prior to lifting the tubing string to test the connection made by the detent assembly with the operator tube, the tubing string is pressured to the shut-in pressure of the well since in checking the connection of the detent assembly, the safety valve is opened exposing the tubing string above the valve to the shut-in well pressure. The opening and closing of the safety valve may be checked by raising and lowering the tubing string several times.

After the valve has been properly tested by opening and closing several times, the inner tubing string is lowered to place the retainer assembly 64 at a sufficient distance below the lower end of the piston 53 to allow the telescoping joint to have ample distance for the piston to move within the tubing section 50 for the opening and closing of the safety valve which requires raising and lowering the piston, the piston rod, the weight section, the detent assembly, and the operator tube of the safety valve. When the elevation of the tubing string has been adjusted to permit proper operation of the telescoping joint and the safety valve, the tubing string is landed and secured in a suitable hanger assembly 440, see FIGURE 2, with the annular space between the inner tubing string and the outer tubing string being sealed by suitable means such as the O-ring 441. Since the tubing string has been supported at an elevation which permits the required movement of the telescoping joint, the piston head is not held against downward movement by the retainer assembly 64 and thus the full weight of the piston, the piston rod, and the weight section along with the detent assembly and operator tube is resting on the safety valve holding the valve in closed position.

As illustrated in FIGURE 2, the annulus between the outer tubing string 42 and the inner tubing string 43 is connected through a lateral flow passage 450 in the wellhead to a conduit 451 which extends from a suitable source of fluid pressure 452.

A suitable source of fluid pressure is an Otis Surface Control Manifold as disclosed at page 3710 of the Composite Catalog of Oil Field Equipment and Services, 1964–65 edition, published by World Oil, Houston, Texas.

The pressure source may be arranged to operate in response to numerous flow dependent and non-flow dependent variables to control the flow control operation. For numerous obvious reasons it may be desirable to suddenly shut in a well. For example, in an offshore located well, the pressure source 452 may be interconnected with a detector system which would actuate the pressure source in response to an impact received by the structure around the well from a ship or barge. Such damage to the wellhead may allow the well to run freely and perhaps catch fire if a safety valve within the well is not closed to shut in the well.

In carrying out the procedure of installing the safety valve every effort is made to eliminate trappings and dirty or corrosive fluids which might damage the mechanism of the valve. In a newly completed well, the well should be allowed to flow to clean up prior to installing the valve. Once the tubing string along with the weight section and the detent assembly is installed on the upper end of the safety valve fluid circulation through the inner tubing string and the annular space 442 is impossible and therefore if desired or deemed necessary to provide clean fluid in the annulus, fluid may be circulated through the inner tubing string in the annulus just prior to lowering the detent assembly over the operator tube of the safety valve.

After the pressure equipment at the surface is connected into the annulus 442, the annulus is substantially filled with fluid to the vicinity of the surface equipment. Any suitable, reasonably clean fluids may be used in the annulus. Clean hydraulic fluid or oil is required only in the surface equipment. The safety valve is opened by increasing the fluid pressure within the annulus 442 from the pressure source 452. The pressure is transmitted throughout the annular space above the seal assembly 324 which seals around the lock mandrel 40 within the landing nipple. The movable portion of the apparatus and thus that portion which is sealed with the fixed members of the assembly extends from the piston 53 downwardly through and including the operator tube 83 of the safety valve assembly. The O-ring 60 seals around the piston head 53 with the inner wall of the housing 50 of the telescoping joint while a seal between the operator tube 83 and the head 171 of the safety valve assembly is formed by the O-ring 190. The pressure within the annular space tending to lift the piston, weight section, and operator tube acts on annular downwardly facing surfaces having an area which equals the area encompassed by the line of contact between the O-ring 60 and the inner wall of the housing 50 reduced by the area enclosed by the line of contact between the O-ring 190 and the outer surface of the operator tube 83. The pressure within the annular space 442 acting on this annular area exerts an upward force on the piston 53 determined by the size of this annular area and the pressure differential between the annular space 442 and the flow passage through the valve at the piston 53. This force acts in an upward direction in opposition to the downward force of the weight section and the spring 200. The pressure within the annular space 442 is increased to a level which lifts the piston, the piston rod, the weight section, and the operator tube 83 sufficiently to open the ball valve 232. So long as the pressure within the annulus 442 is maintained sufficiently high, the valve will be held in open position. If there is a variation in the pressure in the flow through the safety valve it may be necessary to adjust the pressure in the annular space 442 since the differential pressure between the annular space and the flow line acting across the piston 53 holds the weight section and other related apparatus in an upward position to maintain the valve in open position. For example, if the pressure in the flow line through the safety valve increases it may be necessary to increase the pressure in the annular space 442 to continue to provide sufficient pressure differential to overcome the weight section and the spring 200.

So long as the pressure within the annulus 442 is maintained from the pressure source 452, the valve will be supported in open position. Any lowering of the pressure provided from the source 452 below a predetermined minimum will reduce the pressure differential across the piston allowing the weight section resting on the operator tube to push the operator tube downwardly rotating the valve to closed position. The pressure source 452 may be interconnected to sense flow variables in the production system at the well head or other variable conditions at remote control stations which may act through the pressure source 452 to release the pressure within the annular space allowing the valve to be moved to the closed position. The valve is therefore fail-safe and unaffected by depth and flow line condition. Due to the short longitudinal stroke of the operator tube necessary to rotate the valve between open and closed positions only a small quantity of fluid is bled off or pumped into the annular space for opening and closing the valve. The operation of the valve is completely unaffected by the depth at which the valve is positioned since the opening and closing of the valve is controlled by the net force acting across the annular piston resulting from the pressure differential maintained across the piston. When this pressure differential is allowed to drop to essentially zero due to an interruption in the pressure provided in the annular space from the surface the ambient pressure around the annular piston does not affect its action and thus the weight section acts as a dead weight to push the operator tube downwardly rotating the valve from the open to the closed position.

When desired the valve may be removed for inspection or service. The valve 425 at the well head is closed to stop production through the inner tubing string 43. The valve 35 is then closed by releasing the pressure within the annular space 442 by adjustment of the pressure source 452 to permit the weight section to force the valve to closed position. When the valve is closed the wellhead is then bled off by opening line valve 425 to allow pressure relief into the flow line 432. With the pressure then being bled from the flow line to the atmosphere a suitable blowout preventer is then installed on the wellhead along with a suitable polished joint and pack-off. The pressure within the inner tubing string 43 and the annular space 442 is raised to substantially the level of the pressure within the well below the closed valve. The inner tubing string 43 is lifted to disengage the detent latch 33 from the operator tube of the valve. Upward movement of the housing of the detent assembly forces the base ring 91 of the collet 82 upwardly compressing the spring portions 90 of the collet causing the heads 92 of the collet fingers to be pushed against the shoulder 115 on the operator tube camming the collet finger heads outwardly into the locking recess 110 of the body 81 when the locking recess has been aligned with the heads of the collet fingers. The upper ends of the collet fingers are shaped to conform to the downwardly sloping shoulder 111 on the lower end of the locking flange 105 within the body so that when the collet finger heads are cammed into the locking recess they will be latched with the body out of engagement with the operator tube and cannot retract inwardly when the detent assembly is lifted from the operator tube. In raising the inner tubing string the telescoping joint will extend until the lower end of the shoulder 54 of the annular piston rests on the upper end of the retainer assembly 64. Since the spring 160 is disengaged from the lower rim of the flapper valve 130, the valve is held open by the outer surface of the operator tube and when the lower edge of the valve passes the upper end of the operator tube, the spring 143 will pull the valve to the closed position shown in FIGURE 14. As the tubing string is raised, fluid trapped within and escaping from the tubing may swing the flapper valve open sufficiently for the fluid to drain out of the tubing with the spring biasing the valve toward the closed position so that it will act in the nature of a check valve in the event something occurs which would tend to force the fluid upwardly out of the tubing string. The tubing string is lifted until all of the tubing, the telescoping joint, the weight section, and the detent assembly have been removed from the well bore.

The necessary equipment for running a wireline tool string into the well bore is installed at the wellhead. The pulling tool illustrated in FIGURE 26 is connected on the lower end of a wireline tool string including oil or spring jars. The pulling tool is identical in structure to the running tool except in the use of the more shear resistant pins 413 and a shorter spacer skirt 414. The shorter skirt is required because the operator tube over which the pulling tool fits will be downward with the ball valve in the closed position. The shorter length skirt is required to permit the collet of the pulling tool to be positioned downwardly sufficiently to engage the locking recess on the operator tube of the valve. The pulling tool is lowered on the wireline tool string downwardly over the upper end of the valve operator tube with the freely positioned collet 385 riding upwardly within the housing 371 until the upper ends of the collet fingers engage the upper end of the recess 493. The collet finger heads are forced outwardly around the locking flange 113 on the operator tube until the collet fingers pass the locking flange and spring inwardly into engagement with the shoulder 115 at the lower end of the locking flange. The running tool is lifted slightly bringing the flange 405 in alignment with the outer surfaces of the heads of the collet fingers holding the collet in engagement with the operator tube in the position shown in FIGURE 26. Upward force on the pulling tool will now force the operator tube in an upward direction with the lock segments 173 and 174 as shown in FIGURE 1-C engaging the upper end of the recess 180 within the head 171 to lift the head and the tubular housing 172 together with the collet housing 253. It will be recognized at this point that the collet fingers 312 are still engaged in the landing nipple holding the lock mandrel against upward movement. Upward force is now applied by the jars in the tool string to the operator tube causing upward impacts to be transmitted downwardly to the various tubular members connected to the operator tube to lift the collet housing 253. The collet fingers 285 are engaged in the locking recess 290 in alignment with the locking flange 292. The upward force on the collet fingers 285 transmitted through the locking recess 290 lifts the collet against the shear pins 282 which are held against upward movement by the retainer 272 engaged at the upper end thereof against the shoulder 274. The upward jars shear the pins 282 releasing the collet to be lifted by the locking recess 290 upwardly past the locking flange 292 so that when past the flange, the collet fingers are cammed inwardly by the locking recess freeing the collet housing to be lifted to the position relative to the lock mandrel 262 illustrated in FIGURE 1-E. The locking fingers 303 are thus retracted from within the heads of the collet fingers 312 so that the collet fingers may be contracted to disengage the collet from the landing nipple. After the shear pins have been severed, the wireline tool string is lifted with the upper surface of the locking recess 40a of the landing nipple camming the primary locking fingers 312 inwardly releasing the lock mandrel for upward movement through the tubing string. Also, the selector keys 342 are readily cammed inwardly to a retracted position by the sloping surfaces of both, the keys and the complementary recesses of the landing nipple. With the lock mandrel released from the landing nipple, the wireline tool string is lifted from the well bore to remove the valve assembly and the lock mandrel from within the tubing string 42.

The valve system is reinstalled in the well bore by following the installation procedure described hereinabove. It will be recognized, of course, before reinstallation of the flow control device it will be necessary to replace the various severed shear pins, such as the shear pins 280 and 282 within the lock mandrel.

The determination of the amount of weight required in the weight column is affected by a number of factors related to well conditions at the time it is desired that the flow control device shut off fluid flow from a well. These factors may be categorized as those forces acting downwardly tending to move the operator tube in a downward direction to rotate the ball valve to a closed position and those forces acting in an upward direction tending to lift the operator tube and thus rotate the ball valve to an open position. The forces acting downwardly biasing the valve toward closed position result from the following: the hydrostatic pressure of the column of fluid within the inner tubing 43 acting downwardly on the piston 53; the pressure of the well fluid flowing through the flow control device which acts downwardly on the piston; the strength of the spring 200; and the weight of the weight column. The hydrostatic pressure may vary between a maximum when the inner tubing 43 is liquid full to a minimum when the tubing is gas filled. The pressure of the well fluids in the tubing, other than hydrostatic, will, of course, depend upon the formation penetrated by the well and providing the fluids to the tubing. This pressure is readily ascertainable by measurement of the pressure within the well at the approximate elevation at which the piston 53 will be located. Both the hydrostatic pressure and the formation pressure within the flow control device act across the piston tending to force the piston in a downward direction in conjunction with the weight column and the spring to tend to force the ball valve toward closed position.

Those forces which act on the under side of the piston tending to lift the piston and within the operator tube tending to lift the tube combine to bias the valve toward the open position are the following: the force resulting from any pressure drop within the well fluids flowing through the central flow passage of the operator tube; the hydrostatic pressure beneath the piston due to the column of control fluid extending from the surface within the annular space 442 between the inner and outer tubing strings; and the control pressure provided in the annular space from the source 452.

In evaluating these various factors to determine the amount of weight needed in the weight column and thus the value of the control pressure necessary to support the weight, certain of the factors are essentially fixed by well conditions while others are determinable based on the conditions under which it is desired that the valve close upon interruption of the control pressure. In considering the hydrostatic pressure of the column of the well fluids within the inner tubing string, it is generally preferred that it be assumed the wellhead might be so damaged or even knocked off that all liquid would be blown out of the inner tubing string leaving only a column of gas with essentially zero hydrostatic pressure existing in the tubing string at the piston. The force provided by the spring 200 will be a minimum due to the limited space available for such a spring and since the spring is not primarily to perform the complete function of closing the valve under flowing conditions of the well. As previously indicated, of course, the pressure within the inner tubing string from the formation fluids is readily ascertainable.

Considering now the forces which tend to open the valve, the hydrostatic pressure at the piston resulting from the column of control fluid within the annular space between the tubing strings is readily calculatable knowing the fluid which is to be used and the depth at which the piston of the flow control device will be located. Knowing the flowing conditions through the operator tube, an estimate may be readily made of the pressure drop through the tube and thus the force resulting from such drop which tends to lift the tube. In progressing to a solution of the problem of the amount of weight which should be in the weight column, the first value obtained is the amount of weight which combined with the hydrostatic pressure in the inner tubing string, the spring force, and the well fluids pressure would be required to counterbalance the pressure drop through the operator tube in the fluid flowing through the tube combined with the hydrostatic pressure at the piston of the control fluid within the annulus. Knowing this amount of weight, it will then be obvious that any additional weight in the weight column will force the operator tube downwardly to close the ball valve when the control pressure is interrupted. It is this additional weight which is supported by the control pressure in the annulus. It is preferred therefore that the additional weight be several hundred pounds to allow quick and positive closing of the valve. For example, if it is determined that a weight column of 200 pounds coupled with the other downwardly acting forces would counterbalance the force from the pressure drop through the operator tube and the hydrostatic pressure in the annulus, both acting upwardly, it may then be preferred that an additional 300 pounds be added to the weight column to bias the valve toward closed position. The control pressure must, therefore, support this 300 pounds and provide still further force to insure that the valve will be held in an upward open position. Thus, in order to insure that the control pressure will hold the operator tube in an upward position, a control pressure in excess of that necessary to support the additional 300 pounds of weight is provided from the source 452. Therefore, when any condition occurs which interrupts the control pressure, the excess 300 pounds weight in the weight column will be free to force the operator tube downwardly to close the ball valve against the pressure drop through the operator tube and the hydrostatic pressure within the annular space at the piston.

If it is desired to pump fluids into the well through the inner string of tubing after the valve has moved to its closed position, the fluids are pumped into the upper end of the inner tubing string through the flow line 432 and the well head. As the pressure in the inner tubing above the ball is thus raised and exceeds the pressure therebelow to the degree necessary to overcome the upward force exerted on the ball and the lower seat 223 by the spring 224 and by the pressure below the ball and the lower seat, the ball rotates about the operator knobs since the operator members 242 and 243 are now in their lowermost positions and cannot move further downwardly. The ball valve rotates downwardly about an axis offset from its center and is thus moved away from the top upper seat 204 and moves the lower seat 223 downwardly against the force exerted by the spring 224. Such downward and rotary movement ball moves its passage of the ball into communication with the passages of the upper and lower seats and thus permits the downward flow of fluids from the surface through the inner string of tubing.

It will be seen that there has been described and illustrated a new and improved flow control device for use in a well flow conductor to control fluid flow through the conductor responsive to predetermined changes in variables which may be related to or independent of the flow conditions within the conductor.

It will be further seen that a new and improved form of safety valve has been described and illustrated.

It will also be seen that the valve may be used at any desired depth within a well conductor.

It will additionally be seen that the safety valve is operable at a depth below the paraffin level within a well bore.

It will be further seen that the valve does not require a small hydraulic line extending between the valve and the surface independent of the conductor in which the valve is positioned.

It will be further seen that the valve utilizes a valve element which is biased toward a closed position by a weight mass which is counterbalanced by or held in an upward position by the pressure of fluid in an annular flow passage around and independent of the flow passage of the valve through which the production well fluids flow.

It will additionally be seen that the valve is held in open position by a pressure medium supplied by means sensitive to one or more variables which may be related to or entirely independent of the fluid flow being controlled by the valve.

It will be seen that the valve includes locking means engaged below the valve thus allowing a full bore fluid flow passage through the valve to permit maximum utilization of various well tools which may be introduced into and removed from the well bore through the valve.

It will also be seen that the valve eliminates the need to provide an enlarged section in the tubing string to accommodate a flow control device of sufficient size to permit passage of various well tools.

It will be further seen that there has been described and illustrated the combination of a valve with a running tool for positioning the valve within the bore of a well.

It will also be seen that the invention includes a combination of a valve and a pulling tool for removing the valve from a well bore.

It will additionally be seen that there is provided a running tool for introducing a well tool into the bore of a well.

It will also be seen that there is included a pulling tool for removing a tool from the bore of a well.

It will also be seen that while the pulling tool has been illustrated and described as being connected to a string of wire line tools by means of the head member 373, the pulling tool could be connected to the lower end of a string of pipe by means of the internal thread in the upper end of the pulling tool housing 371. In this case, the provision of the O-ring or seal 401 will permit the pressure within such string of pipe to be varied as desired by suitable surface controls. The string of pipe and the safety valve above the close ball would necessarily have to have a pressure maintained therein if the removal of the safety valve must be by use of snubbing equipment due to high pressure conditions within the well.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A flow control device for wells comprising: a flow conduit in a well bore extending to and supported at the well surface; housing means having a flow passage extending therethrough and removably anchored in said flow conduit; valve means disposed in said flow passage to move between open and closed positions; said valve means being provided with a full opening bore therethrough; a tubing string supported in the flow conduit above said valve means; means for biasing said valve means toward closed position including a weight mass adapted to be slidably connected to the lower end of said tubing string supported above said housing means; and pressure responsive means operatively connected with said weight mass and said tubing string, said weight mass being supportable to hold said valve means in open position by the force of a differential in fluid pressure acting across said pressure responsive means at the slidable connection with said tubing string.

2. A flow control device for wells comprising: housing means having a flow passage extending therethrough; means for locking said housing means at a desired elevation within a tubing string; valve means movably disposed in said housing means and adapted to be moved between open and closed positions; means for biasing said valve means toward closed position including a longitudinally slidable weight mass; a tubing string supported from the surface in said well above said valve means; means for slidably interconnecting said weight mass with the lower end of said tubing string supported from the surface including an annular piston movable within said tubing string and supportable by a fluid pressure differential across said piston between the pressure within the well exteriorly around said tubing string and the pressure within said tubing string to support said piston and said weight mass to hold said valve in open position; and said annular piston permitting said weight mass to move said valve to closed position in the absence of said pressure differential across said piston unaffected by the ambient pressure.

3. A flow control device comprising: housing means having a flow passage extending therethrough; means for releasably locking said housing means at a desired elevation within a tubing string; valve means within said housing means adapted to be moved between open and closed positions; longitudinally movable operator means operatively connected with said valve means for rotating said valve means between open and closed positions; means including a weight mass operatively associated with said operator means for biasing said valve means toward closed positions; means for slidably interconnecting said weight mass with a tubing string supported from the surface above said weight mass including pressure responsive means for supporting said weight mass and said operator means to hold said valve in open position responsive to a pressure differential between the inside and outside of said tubing string at the slidable interconnection between said tubing string and said weight mass; and said weight mass being movable to close said valve in the absence of said pressure differential unaffected by the ambient pressure.

4. A flow control device comprising: a housing having a flow passage extending therethrough; means for releasably securing said housing at a desired elevation within a well bore; a valve in said housing movable between open and closed positions to control fluid flow through said flow passage; longitudinally slidable operator means operatively interconnected with said valve for moving said valve between open and closed positions; means including a weight mass operatively associated with said operator means for biasing said operator means in a direction to close said valve; and longitudinally slidable connecting means for connecting said weight mass into a tubing string supported from the surface including an annular piston slidable in said tubing string responsive to a fluid pressure differential across said piston between the exterior of said tubing string and the interior of said tubing string for supporting said weight mass to hold said valve in open position by a fluid pressure differential across said piston independent of the ambient pressure.

5. A flow control device comprising: a housing having a flow passage extending therethrough; means connected with said housing for detachably locking said housing at a desired elevation within a well bore; a valve positioned in said housing for movement between open and closed positions to control fluid flow through said passage; longitudinally movable operator means operatively associated with said valve for moving said valve between open and closed positions; means connected with said operator means for biasing said valve toward a closed position including an elongated weight mass having a fluid flow passage extending therethrough for conducting fluid between said passage through said housing and a tubing string above said weight mass; and means for slidably interconnecting said weight mass with a tubing string supported from the surface including an annular piston slidable in said tubing string for supporting said weight mass and operator means to hold said valve in open position responsive to a fluid pressure differential between the pressure in a fluid below said piston exterior of said tubing string and the pressure of fluid flowing through said tubing string; and said weight mass and operator means being movable to close said valve in the absence of said pressure differential across said annular piston independent of ambient pressure.

6. A flow control device comprising: a housing having a flow passage extending therethrough; means for detachably locking said housing at a desired elevation in a well bore; a valve disposed in said housing for movement between open and closed positions to control fluid flow through said flow passage; a longitudinally movable operator tube operatively associated with said valve for moving said valve between open and closed positions, said operator tube extending above said housing and having a flow passage communicating with said flow passage through the housing; an elongated weight mass connected with said operator tube and having a flow passage extending therethrough in communication with said flow passage through said operator tube; and a telescoping joint connected with said weight mass including an annular piston adapted to fit in a tubing string supported from the surface whereby a pressure differential applied across said annular piston between a fluid surrounding said tubing string and fluid flowing through said tubing string from said housing supports said weight mass to hold said valve in open position; and said telescoping joint permitting said weight mass and operator tube to depress said valve to move said valve to closed position in the absence of a pressure differential across said annular piston independent of the ambient pressure.

7. A flow control device comprising: a housing having a flow passage extending therethrough; a lock mandrel secured to said housing for detachably supporting said housing within a tubing string; a valve in said housing adapted for movement between open and closed positions for controlling fluid flow through said passageway; an operator tube slidably disposed in said housing and operatively connected with said valve for moving said valve between open and closed positions in response to longitudinal movement of said operator tube; means biasing said operator tube in a downward direction to move said valve toward closed position including a tubular weight mass engaged at the lower end thereof over said operator tube and at the upper end thereof in sliding relationship with a tubing string supported from the surface of said well including an annular piston slidable within said tubing string and adapted to be supported longitudinally by the force of a pressure differential between the exterior and interior of said tubing string at said annular piston; and said piston, weight section, and operator tubing being free to move downwardly to close said valve in the absence of said pressure differential independent of the ambient pressure.

8. A flow control device comprising: a housing having a flow passage extending therethrough; a valve in said housing movable between open and closed positions for controlling fluid flow through said flow passage; an operator tube slidably disposed in said housing and interconnected with said valve for moving said valve between open and closed positions responsive to longitudinal movement of said tube; means detachably engaged with said operator tube including an elongated weight mass for biasing said valve toward closed position; and means engaged on the upper end of said weight mass for slidably connecting said weight mass into the lower end of a tubing string supported from above said device including an annular piston disposed within said tubing string and supportable in response to the force of a pressure differential acting across said annular piston between the interior and exterior of said tubing string to hold said weight mass and operator tube in an upward position relative to said housing for retaining said valve in open position; and said annular piston, said weight mass, and said operator tube beng adapted to move downwardly relative to said housing in the absence of said pressure differential independent of the ambient pressure to close said valve.

9. A flow control device comprising: a housing having a flow passage extending therethrough; a lock mandrel engaged with the lower end of said housing for detachably latching said housing within a tubing string to support said housing at a desired elevation within said tubing string; a valve within said housng movable between open and closed positions for controlling flow through said flow passage; an operator tube slidably supported in said housing and interconnected with said valve for moving said valve between open and closed positions in response to the longitudinal movement of said operator tube, the upper end of said operator tube extending above said housing; means for biasing said operator tube downwardly to urge said valve toward closed position including resilient means engaged between said housing and said operator tube and an elongated weight column detachably secured to said operator tube above said housing; and slidable means for connecting said weight mass to a tubing string supported from above said flow control device including an annular piston slidable within said tubing string for supporting said weight mass responsive to a pressure differential across said piston to hold said valve in open position.

10. A flow control device comprising: a lock mandrel detachably securable within a tubing string and having a fluid flow passage extending therethrough; a valve housing supported on said lock mandrel and having a fluid flow passage extending therethrough in communication with said flow passage through said lock mandrel; a valve positioned within said housing adapted for movement between open and closed position to control fluid flow through said flow passage of said housing; an operator tube slidably supported within said housing and operatively associated with said valve for rotating said valve between open and closed positions responsive to longitudinal movement of said operator tube, said operator tube extending through the upper end of said housing and having a longitudinal flow passage opening into said flow passage through said housing; means forming a seal around said operator tube with said housing; an elongated tubular section connected to the upper end of said operator tube and being adapted to move longitudinally to reciprocate said operator tube for moving said valve between open and closed positions; and means for slidably interconnecting the upper end of said tubular means with the lower end of a tubing string supported above said flow control device including an annular piston movable within said tubing string and having a seal between said tubing string and said annular piston, the difference in the area within the line of sealing engagement between said annular piston and said tubing string and the area within the line of sealing engagement between said sealing means around said operator tube with said valve housing defining an annular area formed by downwardly facing surfaces on said annular piston, said tubular means, and said operator tube acted upon by a pressure differential between the exterior and interior of said tubular string to support said annular piston, tubular means, and operator tube responsive to a controlled pressure around said tubing string for holding said annular piston, tubular means, and operator tube in an upward position to bias said valve toward open position; and said annular piston, tubular means, and operator tube being free to move downwardly to close said valve in the absence of said controlled pressure independent of the ambient pressure.

11. A flow control device comprising: a lock mandrel having a flow passage extending therethrough and being detachably engageable at a desired elevation in the tubing string of a well bore; a valve housing supported on said lock mandrel and having a flow passage extending therethrough; a ball valve in said valve housing adapted for rotation between open and closed positions to control fluid flow through said flow passage; an operator tube having a fluid flow passage extending therethrough in communication with said flow passage through said housing slidably disposed in said housing and extending above the upper end of said housing, said operator tube being operatively interconnected with said valve for rotating said valve between open and closed positions responsive to longitudinal movement of said operator tube; spring means engaged between said operator tube and said housing for biasing said operator tube downwardly to bias said valve toward closed position; means forming a seal around said operator tube with said valve housing; an elongated tubular weight mass having a fluid flow passage extending therethrough in communication with said flow passage through said operator tube, said weight mass being detachably engaged on the upper end of said operator tube; telescoping joint means on the upper end of said weight mass for slidable connection with a tubing string supported above said weight mass including an annular piston slidable within said tubing string and having means forming a fluid seal around said annular piston with the inner wall of said tubing string; the difference between the area within the line of sealing engagement between said annular piston and said tubing string and the area within the line of sealing engagement between said operator tube and said valve housing defining an annular area acted upon by a controlled pressure differential between the exterior and interior of said tubing string to support said weight mass and operator tube in an upward position to hold said valve in open position; and said connection between said weight mass and said tubing string permitting said operator tube and said weight mass to move downwardly to close said valve in the absence of said controlled pressure differential independent of the ambient pressure.

12. A fluid flow control device comprising: a lock mandrel having a flow passage extending therethrough and adapted to be releasably engaged in a tubing string; a tubular valve housing supported on said lock mandrel and having a flow passage extending therethrough in communication with said flow passage through said lock mandrel; a rotatable ball valve positioned in said valve housing and adapted to be rotated between open and closed positions for controlling fluid flow through said flow passage of said housing; a longitudinally movable operator tube operatively interconnected with said ball valve for rotating said ball valve between open and closed position, said operator tube extending through the upper end of said valve housing and having a fluid flow passage communicating with said flow passage through said valve housing; a spring confined between said operator tube and said valve housing for biasing said operator tube in a downward direction to bias said valve toward closed position; means forming a seal around said operator tube with said valve housing; an elongated tubular weight mass adapted for detachable connection to the upper end of said operator tube and having a flow passage extending therethrough communicatable with said flow passage through said operator tube; means for detachably connecting the lower end of said weight mass over the upper end of said operator tube including means forming a fluid seal around said operator tube; means on the upper end of said weight mass for telescopically interconnecting said weight mass with a tubing string supported above said weight mass, said means including an annular piston engaged with the upper end of said weight mass and operable within said tubing string to permit said weight mass and said operator tube to move longitudinally relative to said tubing string for rotating said valve between open and closed positions; means forming a seal around said annular piston with the inner wall of said tubing string; the area within the line of sealing engagement between said sealing means around said annular piston and the inner wall of said tubing string reduced by the area of the line of sealing engagement between said operator piston and said valve housing defining an annular area acted upon by a control pressure differential between the interior and exterior of said tubing string to support said annular piston, said weight mass, and said operator tube in an upward position to hold said valve in open position; and said annular piston, said weight mass, and operator tube being adapted to move downwardly to close said valve in the absence of said pressure differential independent of the ambient pressure.

13. A fluid flow control device comprising: a lock mandrel having a flow passage therethrough and adapted to be releasably latched in a tubing string; a tubular housing secured to and supported on said lock mandrel having a fluid flow passage therethrough interconnected with said flow passage through said lock mandrel; a ball valve movably positioned within said valve housing and adapted to be rotated between a first open position and a second closed position, said ball valve having operator holes permitting said ball valve to be engaged for rotation between said first and second positions; an operator member movable longitudinally and laterally within said housing for engaging and rotating said ball valve between said first and second positions; an operator tube slidably positioned within said housing and extending upwardly therefrom, said operator tube having a flow passage extending therethrough communicating with said flow passage through said housing; said operator tube and said operator member being operatively associated whereby longitudinal movement of said operator tube relative to said housing actuates said operator member to rotate said ball valve between said first and second positions; spring means engaged between said housing and said operator tube for biasing said operator tube to bias said ball valve toward said second position; seal means forming a seal around said operator tube with said valve housing; an elongated tubular weight mass having a fluid flow passage extending therethrough communicatable with said flow passage through said operator tube; means for detachably connecting the lower end of said tubular weight mass over the upper end of said operator tube including a collet engageable and disengageable with said operator tube responsive to the application of longitudinal force between said weight mass and said operator tube; means forming an annular seal around said operator tube or within the lower end of said weight mass; means for slidably interconnecting the upper end of said weight mass with the lower end of a tubing string supported above said weight mass to permit said weight mass to move longitudinally relative to said tubing string, said means including an annular piston having annular means forming a fluid seal around said piston within said tubing string; the difference in the area encompassed by the line of sealing engagement between said annular piston and said tubing string and the area encompassed by the line of sealing engagement between said operator tube and said valve housing defining an annular area to which a controlled force of a pressure differential across said tubing string is applicable to support said weight mass and said operator tube in an upward position to hold said valve in said first open position; and said weight mass and said operator tube being adapted to slide downwardly to close said ball valve in the absence of a pressure differential across said piston independent of the ambient pressure.

14. A flow control device comprising: a lock mandrel adapted to be positioned and latched in a landing nipple of a tubing string, said mandrel having a flow passage therethrough, said lock mandrel having first shearable means for holding said mandrel in unlocked condition until actuated by an impact force for setting said mandrel in a landing nipple and second shearable means adapted to be severed to release said lock mandrel from a locked condition in a landing nipple; a valve housing supported on said lock mandrel and having a fluid flow passage therethrough communicating with said flow passage through said mandrel; a ball valve rotatably supported within said housing having a flow passage therethrough adapted to be aligned with said flow passage through said housing at a first open position to permit flow through said passage and to be rotated out of alignment with said flow passage through said housing to a second closed position to shut off flow through said valve; a lower tubular valve seat slidably positioned within said housing and having an annular seat surface engageable with said ball valve, spring means engaged with said lower valve seat for biasing said valve seat toward said ball valve; an upper tubular valve seat having an annular seat surface engaged with said ball valve; said ball valve being provided with operator holes; operator member means slidably positioned within said housing and having operator knob means engaged in said operator holes of said ball valve for rotating said ball valve between said first and second positions responsive to longitudinal movement of said operator means; an operator tube slidably engaged with said valve housing and having a fluid flow passage therethrough communicating with said flow passage through said valve housing, said operator tube being connected to said operator member means for moving said member means responsive to longitudinal movement of said operator tube; seal means between said operator tube and said valve housing; spring means operatively engaged between said operator tube and said valve housing for biasing said operator tube in a downward direction to bias said ball valve toward said second closed position; the upper end of said operator tube extending above said valve housing; a tubular elongated weight mass; means for detachably connecting the lower end of said weight mass with the upper end of said operator tube including a collet adapted to be engaged and disengaged with said operator tube responsive to longitudinal movement between said operator tube and said weight mass; said weight mass being adapted to depress said operator tube to move said ball valve from open to closed position and being adapted to lift said operator tube to rotate said ball valve from closed to open position; said weight mass having a flow passage therethrough communicating with said flow passage through said operator tube; a tubular piston rod having a flow passage therethrough connected with the upper end of said weight mass for movably suspending said weight mass and said operator tube; an annular piston head engaged on the upper end of said piston rod adapted to be slidably supported within a tubing string suspended from above said weight mass; seal means around said annular piston to seal with the inner wall of a tubing string; means connectable with the lower end of a tubing string around said piston rod for retaining said annular piston within said tubing string; the line of sealing engagement around said annular piston with said tubing string encompassing an area larger than the area encompassed by the line of sealing engagement around said operator tube with said valve housing to provide annular downwardly facing surfaces associated with said piston, said weight mass, and said operator tube exposable to the force of a controlled pressure differential between the exterior of said tubing string and the interior of said string to support said annular piston, said weight mass, and said operator tube in an upward position to hold said ball valve in said first open position; and said annular piston, said weight mass, and said operator tube being movable downwardly in the absence of said pressure differential independent of the ambient pressure to move said ball valve to said second closed position.

15. A fluid flow control device according to claim 14 including in addition thereto a flapper valve at the lower end of said weight column adapted to be held in open position during engagement of said weight column over said operator tube and while said weight column is engaged over said operator tube and closable upon withdrawal of said weight column from said operator tube.

16. A flow control device for wells comprising: a tubing string suspended from the surface in a well bore; valve means engageable within said well bore below the lower end of said tubing string and having a full opening bore longitudinally therethrough; means including a weight mass having a slidable sealed connection with the lower end of said tubing string and operatively associated with said valve means for biasing said valve means toward a closed position; and means for supporting said weight mass to hold said valve means in open position comprising a pressure area on said weight member slidable with respect to said tubing string and responsive to a controlled fluid pressure differential between the pressure of fluid flowing through said valve means and the pressure of a separate body of fluid pressure in the well bore surrounding the tubing string and surrounding said valve means.

17. A flow control device according to claim 16 wherein the pressure responsive means for supporting the weight mass includes an annular piston engaged with said weight mass and slidable in a tubing string suspended above said weight mass, said annular piston being responsive to a fluid pressure differential between the pressure of fluid around said tubing string and the pressure of fluid within said tubing string providing a controllable force for supporting said weight column to hold said valve means in open position.

18. A flow control device comprising: a valve housing having a flow passage therethrough; a valve movably disposed in said housing adapted to be moved between open and closed positions; a longitudinally movable operator tube having a flow passage therethrough communicating with said flow passage through said valve housing, said operator tube being slidably disposed within said valve housing and extending upwardly therefrom for moving said valve between open and closed positions responsive to longitudinal movement of said operator tube; an elongated weight mass detachably securable to the upper end of said operator tube and adapted to be slidably connected to the lower end of a tubing string, said weight mass having a fluid flow passage therethrough communicating with said flow passage through said operator tube and being adapted to be supported by a pressure differential between the interior and exterior of said tubing string for holding said weight mass upwardly to retain said valve in open position; and running tool means detachably engageable over the upper end of the said operator tube for supporting said valve housing and operator tube and lowering said housing and tube through a well bore while holding said operator tube in an upward position to hold said valve at least partially open to allow fluid flow through said valve while moving said valve into a well bore.

19. A flow control device according to claim 18 wherein said running tool means comprises: a tubular housing adapted to fit over the upper end of said operator tube; an annular collet slidably disposed within said housing for releasably interconnecting said housing with said operator tube, said collet being longitudinally movable between a position for latching onto said operator tube, a position for engaging and longitudinally supporting said operator tube, and a position for releasing said housing from said operator tube; an annular retainer ring within said housing below the base of said collet, said retainer ring being holdable by shearable means at a longitudinal position for retaining said collet in a locked relationship with said operator tube and when said shearable means is severed said retainer ring being movable to a lower position relative to said housing freeing said collet to move to said position for releasing said housing from said operator tube; a head member engaged on said housing for supporting said housing and securing said housing to supporting means for lowering said tool through a well bore; and a spacer skirt engaged with the lower end of said housing, the lower end of said spacer skirt being spaced from said collet a predetermined distance to position said operator tube relative to said valve housing to hold said valve means in at least partially open position while lowering said operator tube and valve housing on said running tool through a well bore.

20. A running tool for handling a fluid flow control device having a housing and an operator tube movable longitudinally relative to said housing, said tool comprising: a tubular housing adapted to fit over the upper end of said operator tube; an annular collet slidably disposed within said housing for releasably interconnecting said housing with said operator tube, said collet being longitudinally movable between a position for latching onto said operator tube, a position for engaging and longitudinally supporting said operator tube, and a position for releasing said housing from said operator tube; an annular retainer ring within said housing below the base of said collet, said retainer ring being holdable by shearable means at a longitudinal position for retaining said collet in a locked relationship with said operator tube and when said shearable means is severed said retainer ring being movable to a lower position relative to said housing freeing said collet to move to said position for releasing said housing from said operator tube; a head member engaged on said housing for supporting said housing and securing said housing to supporting means for lowering said tool through a well bore; and a spacer skirt engaged with the lower end of said housing, the lower end of said spacer skirt being spaced from said collet a predetermined distance to position said operator tube relative to said valve housing to hold said valve means in at least partially open position while lowering said flow control device on said running tool through a fluid filled well bore.

21. Apparatus in accordance with claim 20 wherein said running tool means comprises: a tubular housing; an annular collet slidably disposed within said housing to move longitudinally between a first upper position for engaging said collet over said operator tube, a second intermediate position for interlocking said housing with said operator tube, and a third lower position for releasing said housing from said operator tube; said housing having an upper internal annular locking recess to receive the heads of said collet at said first position of said collet, a lower internal annular locking recess to receive said heads of said collet at said third position of said collet, and a locking flange between said locking recesses for holding said collet head in locked relationship between said housing and said operator tube at said second position of said collet; an internal annular retainer ring within said housing below said collet, said retainer ring being detachably securable by shearable means to said housing at a first position for holding said collet at said second position and being movable to a second position for allowing said collet to move to said third position; and an annular spacer skirt engaged with the lower end of said housing and extending into said housing to support said retainer ring at said second position of said retainer ring and the lower end of said spacer skirt being spaced from said collet heads a sufficient distance to hold said operator tube in an upper position for retaining said valve in open position while lowering said flow control device through a well bore.

22. A running tool for handling a fluid flow control device having a housing and an operator tube movable longitudinally relative to said housing, said tool comprising: a tubular housing; an annular collet slidably disposed within said housing to move longitudinally between a first upper position for engaging said collet over said operator tube, a second intermediate position for interlocking said housing with said operator tube, and a third lower position for releasing said housing from said operator tube; said housing having an upper internal annular locking recess to receive the heads of said collet at said first position of said collet, a lower internal annular locking recess to receive said heads of said collet at said third position of said collet, and a locking flange between said locking recesses for holding said collet head in locked relationship between said housing and said operator tube at said second position of said collet; an internal annular retainer ring within said housing below said collet, said retainer ring being detachably securable by shearable means to said housing at a first position for holding said collet at said second position and being movable to a second position for allowing said collet to move to said third position; and an annular spacer skirt engaged with the lower end of said housing and extending into said housing to support said retainer ring at said second position of said retainer ring and the lower end of said spacer skirt being spaced from said collet heads a sufficient distance to hold said operator tube in an upper position for retaining a valve in said flow control device in open position while lowering said flow control device through a well bore.

23. A flow control device comprising: a valve housing having a flow passage therethrough; a valve movably disposed in said housing adapted to be moved between open and closed positions; a longitudinally movable operator tube having a flow passage therethrough communicating with said flow passage through said valve housing, said operator tube being slidably disposed within said valve housing and extending upwardly therefrom for moving said valve between open and closed positions responsive to longitudinal movement of said operator tube; an elongated weight mass detachably securable to the upper end of said operator tube and adapted to be slidably connected to the lower end of a tubing string, said weight mass having a fluid flow passage therethrough communicating with said flow passage through said operator tube and being adapted to be supported by a pressure differential between the interior and exterior of said tubing string for holding said weight mass upwardly to retain said valve in open position; and pulling tool means detachably engageable over the upper end of said operator tube for supporting said valve housing and operator tube and lifting said housing and tube through a well bore while permitting said operator tube to be biased downwardly to hold said valve in closed position.

24. A flow control device according to claim 23 wherein said pulling tool comprises: a tubular housing adapted to fit over the upper end of said operator tube; an annular collet slidably disposed within said housing for releasably interconnecting said housing with said operator tube, said collet being longitudinally movable between a position for latching onto said operator tube, a position for engaging and longitudinally supporting said operator tube, and a position for releasing said housing from said operator tube; an annular retainer ring within said housing below the base of said collet, said retainer ring being holdable by shearable means at a longitudinal position for retaining said collet in a locked relationship with said operator tube and when said shearable means is severed said retainer ring being movable to a lower position relative to said housing freeing said collet to move to said position for releasing said housing from said operator tube; and a head member engaged on said housing for supporting said housing and securing said housing to supporting means for lifting said flow control device through a well bore.

25. A pulling tool for removing from a well bore a fluid flow control device having a housing and an operator tube movable longitudinally relative to said housing, said pulling tool comprising: a tubular housing adapted to fit over the upper end of said operator tube; an annular collet slidably disposed within said housing for releasably interconnecting said housing with said operator tube, said collet being longitudinally movable between a position for latching onto said operator tube, a position for engaging and longitudinally supporting said operator tube, and a position for releasing said housing from said operator tube; an annular retainer ring within said housing below the base of said collet, said retainer ring being holdable by shearable means at a longitudinal position retaining said collet in a locked relationship with said operator tube and when said shearable means is severed said retainer ring being movable to a lower position relative to said housing freeing said collet to move to said position for releasing said housing from said operator tube; and a head member engaged on said housing for supporting said housing and securing said housing to supporting means for lowering said tool through a well bore.

26. A pulling tool for removing from a well bore a fluid flow control device having a housing and an operator tube movable longitudinally relative to said housing, said pulling tool comprising: a tubular housing; an annular collet slidably disposed within said housing to move longitudinally between a first upper position for engaging said collet over said operator tube, a second intermediate position for interlocking said housing with said operator tube, and a third lower position for releasing said housing from said operator tube; said housing having an upper internal annular locking recess to receive the heads of said collet at said first position of said collet, a lower internal annular locking recess to receive said heads of said collet at said third position of said collet, and a locking flange between said locking recesses for holding said collet heads in locked relationship between said housing and said operator tube at said second position of said collet; an internal annular retainer ring within said housing below said collet, said retainer ring being detachably securable by shearable means to said housing at a first position for holding said collet at said second position and being movable to a second position for allowing said collet to move to said third position; and an annular spacer skirt engaged with the lower end of said housing and extending into said housing to support said retainer ring at said second position.

27. A flow control device for controlling fluid flow through a flow conductor including: a valve housing; means for supporting said valve housing in a flow conductor and sealing between said valve housing and said flow conductor, said valve housing having a fluid flow passage therethrough; a ball valve movably mounted within said housing and having a flow passage therethrough; a lower tubular valve seat movable longitudinally within said housing and having an annular seat surface engageable with said ball valve; an upper tubular valve seat having an annular seat surface engageable with said ball valve; spring means biasing said lower valve seat upwardly toward said ball valve; and operator means movably disposed within said housing for movement between upper and lower positions, said operator means and said ball valve having co-engageable means for rotating said ball valve upon longitudinal movement of said operator means in said housing between a first open position wherein fluid flow can occur through said valve housing through said tubular valve seats and said ball valve and a second closed position wherein said ball valve prevents flow through said valve housing, said ball valve being in said second position when said operator means is in said lower position, said ball valve being movable downwardly and rotatable in said housing from said second closed position to a third open position upon downward movement of said ball valve relative to said operator means when said operator means is in said second position, said lower valve seat being movable downwardly by said ball valve against the resistance of said spring when said ball valve moves from said second position to said third position.

28. The flow control device of claim 27, and an operator tube connected to said operator means and extending upwardly of said valve housing and said upper valve seat, and means engageable with said operator tube above said housing biasing said operator means downwardly toward said lower position.

References Cited

UNITED STATES PATENTS

| | | | |
|---|---|---|---|
| 2,813,588 | 11/1957 | O'Reilly | 166—224 X |
| 2,831,539 | 4/1958 | En Dean et al. | 166—73 |
| 2,874,927 | 2/1959 | Conrad | 166—226 X |
| 2,885,006 | 5/1959 | Long et al. | 166—224 X |
| 2,894,715 | 7/1959 | Bostock | 166—72 X |
| 2,998,077 | 8/1961 | Keithahn | 251—58 X |
| 3,007,669 | 11/1961 | Fredd | 166—72 X |
| 3,035,641 | 5/1962 | Page | 166—224 X |
| 3,092,135 | 6/1963 | Brown et al. | 166—224 X |
| 3,126,908 | 3/1964 | Dickens | 166—224 X |
| 3,156,300 | 11/1964 | Page et al. | 166—72 X |
| 3,189,044 | 6/1965 | Sizer | 166—224 X |
| 3,216,501 | 11/1965 | Page | 166—72 |
| 3,236,255 | 2/1966 | Sizer | 166—224 X |

CHARLES E. O'CONNELL, *Primary Examiner.*

IAN A. CALVERT, *Assistant Examiner.*